(12) United States Patent
Fahys

(10) Patent No.: US 9,811,787 B2
(45) Date of Patent: Nov. 7, 2017

(54) SYSTEM AND METHOD FOR SPORTS GROUP ADMINISTRATION

(76) Inventor: Louise T. Fahys, Cary, NC (US)

( * ) Notice: Subject to any disclaimer, the term of this patent is extended or adjusted under 35 U.S.C. 154(b) by 782 days.

(21) Appl. No.: 11/870,194

(22) Filed: Oct. 10, 2007

(65) Prior Publication Data
US 2008/0086512 A1    Apr. 10, 2008

Related U.S. Application Data

(60) Provisional application No. 60/850,679, filed on Oct. 10, 2006.

(51) Int. Cl.
*G06Q 10/00* (2006.01)
*G06Q 99/00* (2006.01)
*G06Q 10/06* (2012.01)

(52) U.S. Cl.
CPC .................................. *G06Q 10/06* (2013.01)

(58) Field of Classification Search
USPC .............................................. 705/9, 1.1, 319
See application file for complete search history.

(56) References Cited

U.S. PATENT DOCUMENTS

| | | | |
|---|---|---|---|
| 6,334,133 B1 * | 12/2001 | Thompson et al. | 707/104.1 |
| 2005/0114195 A1 * | 5/2005 | Bernasconi | 705/9 |
| 2006/0270419 A1 * | 11/2006 | Crowley et al. | 455/456.2 |
| 2007/0060328 A1 * | 3/2007 | Zrike et al. | 463/29 |

OTHER PUBLICATIONS

TennisLink—TDM Manual, Version 1.3, <http://tennislink.usta.com/tournaments/TDM/Documents/TDMManual.pdf>, Updated Jul. 2005.*
"Diamond Scheduler Sports Scheduling Software for Leagues and Tournaments: Support" http://www.cactusware.com/versions.cfm, accessed May 2, 2012.*

* cited by examiner

*Primary Examiner* — Jonathan Ouellette
*Assistant Examiner* — Amanda Kirlin
(74) *Attorney, Agent, or Firm* — John L Sotomayor

(57) ABSTRACT

A system for sports group management, including a sports group management server, a plurality of databases accessible by the server including at least one of a player database, a substitute database, and a schedule database, an Internet accessible user interface, software for receiving group data via the user interface, the group data including information concerning at least some of a plurality of players in a sports group, schedule software executing on the server for generating a schedule of group events for each of the plurality of players based on the group data, the schedule accessible via the user interface, and substitute software executing on the server for receiving a substitute request for at least one of the group events and determining at least one substitute player for the group event.

16 Claims, 41 Drawing Sheets

Your schedule has been created.

Tuesday Group Schedule
Ivan Lendel

| Date | Court | Player 1 | Player 2 | Player 3 | Player 4 |
|---|---|---|---|---|---|
| 09-12-2006 | 1 | Frannie G. | Pam J. | Sally S. | Louise F. |
| 09-19-2006 | 1 | Sally S. | Pam J. | Bonnie B. | Frannie G. |
| 09-26-2006 | 1 | Bonnie B. | Pam J. | Sally S. | Louise F. |
| 10-03-2006 | 1 | Frannie G. | Pam J. | Bonnie B. | Louise F. |
| 10-10-2006 | 1 | Louise F. | Bonnie B. | Frannie G. | Sally S. |
| 10-17-2006 | 1 | Frannie G. | Pam J. | Sally S. | Louise F. |
| 10-24-2006 | 1 | Bonnie B. | Pam J. | Bonnie B. | Louise F. |
| 10-31-2006 | 1 | Frannie G. | Pam J. | Sally S. | Pam J. |
| 11-07-2006 | 1 | Bonnie B. | Frannie G. | Bonnie B. | Louise F. |
| 11-14-2006 | 1 | Sally S. | Lily H. | Frannie G. | Lily H. |
| 11-21-2006 | 1 | Pam J. | Louise F. | Sally S. | Louise F. |
| 11-28-2006 | 1 | Bonnie B. | Frannie G. | Pam J. | Sally S. |
| 12-05-2006 | 1 | Lily H. | Bonnie B. | Sally S. | Louise F. |
| 12-12-2006 | 1 | Frannie G. | Pam J. | Bonnie B. | Lily H. |
| 12-19-2006 | 1 | Frannie G. | Louise F. | Sally S. | Lily H. |
| 12-26-2006 | 1 | Frannie G. | Frannie G. | Sally S. | Pam J. |
| 01-02-2007 | 1 | Bonnie B. | Lily H. | Pam J. | Louise F. |
| 01-09-2007 | 1 | Bonnie B. | Frannie G. | Sally S. | Lily H. |
| 01-23-2007 | 1 | Bonnie B. | Pam J. | Sally S. | Louise F. |
| 01-30-2007 | 1 | Lily H. | Frannie G. | Pam J. | Sally S. |

From: Debbie Zaccardelli [dbzac@mindspring.com]
To: Brhys@mytennisgroup.com
Cc:
Subject: MTG Team Match Reminder for 6.5 Combo Doubles

MyTennisGroup.com

You have a Team Match coming up. Here are the details:

Team Match Details:

Date: Oct 8th, Monday
Time: 9:30 am-12:00 am
Bring Balls: Yes
Court: Doubles 1
Tennis Center: Cary Tennis Ctr
Group: 6.5 Combo Doubles Need A Sub? Click Here to send a substitute request Thank You.

Welcome Louise Fahys!

MyGroups

Group 1
Group 1
Monday Group
New Group
Sunday Group
Tuesday Group

MyGroup Player Detail

Monday Group - Shippan (203) 323-3129 Monday 1:30 pm to 3:00 pm

View Schedule                          E-Mail MyGroup

Bonzoid Cleaver    102         Test One
Yvette Eenkema                 Nancy Sommi
Van Dijk
Louise Fahys      203 559-
Fred Freddie                   Margaret Terror    adf
Bobby Funhouse    203 559 91   Bonnie Tyler
Debbie Hatfield                Callie Tyler3
Jim Hendricks     203 559 91   Anne Walker
                               Donny Weed         919 462
Kerry Mccoy                    Pam White

MyTennisGroup.com

Louise Fshys has requested a swap for the following private lesson with Jarry Carest.

Lesson Details:

Date: Oct 26th, Friday
Time: 11:00 am-12:00 pm
Tennis Center:
Group: Louise's Lessons
Payment: None Your Lesson (to be swapped):

Date: Oct 14th, Sunday
Time: 9:30 am-10:30 am
Tennis Center: Cary Tennis Center

Click Here if you would like to swap this private lesson.

Thank You.

From: Louise Fahys [lfahys@codeasite.com]
To: green@codesite.com
Cc:
Subject: Tennis on Oct 16th, Tuesday

MyTennisGroup.com

Louise Fahys has proposed a tennis match with the following details:

Match Details:

Date: Oct 16th, Tuesday
Time: 7:00 am-9:30 am
Tennis Center: Cary Tennis Center
Additional Information:

To view the other players and Accept or Decline this invitation *Click Here*

Thank You.

From: Jerry Carest [jcarest@codesite.com]
To: lluberts@sssitesite.com
Cc:
Subject: Tennis on Oct 23rd, Tuesday

MyTennisGroup.com

Jerry Carest has proposed a tennis lesson with the following details:

Match Details:

Date: 10-23-2007
 10-30-2007
 11-06-2007
 11-13-2007
 11-20-2007
Time: 8:00 am-9:30 am
Tennis Center: Cary Tennis Center
Additional Information:

To Accept or Decline this invitation Click Here

Thank You.

FIG. 18D

SYSTEM AND METHOD FOR SPORTS GROUP ADMINISTRATION

CROSS-REFERENCE TO RELATED APPLICATIONS

This application claims the benefit of, under 35 U.S.C. 119(e), U.S. Provisional Patent Application No. 60/850,679, filed Oct. 10, 2006, which application is hereby incorporated by reference herein.

FIELD OF THE INVENTION

The invention relates to sports groups and/or leagues, and more specifically to a system and method for managing a sports group.

BACKGROUND OF THE INVENTION

Sports groups are common in many sports (e.g., group or individual), such as tennis. The groups may include any number of players or teams who participate and/or compete in regular matches against one another over a period of time. The matches may be purely recreational matches or competitive matches played in a tournament format.

Depending on the number of players in a particular group, it is often very difficult to schedule and manage each of the individual matches between each of the plurality of players. The management of such a group becomes more difficult when a player must cancel a match and a substitute player is needed. It is time consuming for the both the group manager and the players.

What is desired therefore is a system and method for managing a sports group or league. What is further desired is such a system and method including a means to schedule matches or games and other events, and means to determine and provide substitute players and/or teams.

SUMMARY OF THE INVENTION

Accordingly, it is an object of the present invention to provide a means to manage and administer a sports group, such as a tennis group. It is a further object of the present invention to provide a system for managing and administering groups organized to participate in any number of sports as well as other activities, such as card games, board games, etc.

These and other objectives are achieved by providing a system a system for sports group management, including a sports group management server, a plurality of databases accessible by the server including at least one of a player database, a substitute database, and a schedule database, an Internet accessible user interface, software for receiving group data via the user interface, the group data including information concerning at least some of a plurality of players in a sports group, schedule software executing on the server for generating a schedule of group events for each of the plurality of players based on the group data, the schedule accessible via the user interface, and substitute software executing on the server for receiving a substitute request for at least one of the group events and determining at least one substitute player for the group event.

Other objectives of the present invention are achieved by providing a method for managing a sports group, including the steps of receiving via an Internet-based user interface group data pertaining to at least one sports group, generating a schedule of a plurality of matches between a plurality of players of the sports group, providing the schedule of the matches via the user interface, receiving a substitute player request for at least one of the plurality of matches, and determining at least one substitute, and transmitting an invitation to the at least one substitute.

In one exemplary embodiment, a website designed to help tennis players manage the scheduling of their tennis groups is provided. A group manager or administrator using the present invention may create a tennis schedule for a plurality of participants (e.g., players) in a group, create Internet accessible accounts for each of the participants, maintain substitution player lists, post messages to each of the participants, and send the participants regular e-mail reminders about scheduled match play. The present invention further provides for automatic substitution of players from administrator or participant created substitution lists and/or a database of predetermined substitute players.

Other objects, features and advantages according to the present invention will become apparent from the following detailed description of certain advantageous embodiments when read in conjunction with the accompanying drawings in which the same components are identified by the same reference numerals.

BRIEF DESCRIPTION OF THE DRAWINGS

Figure 3:
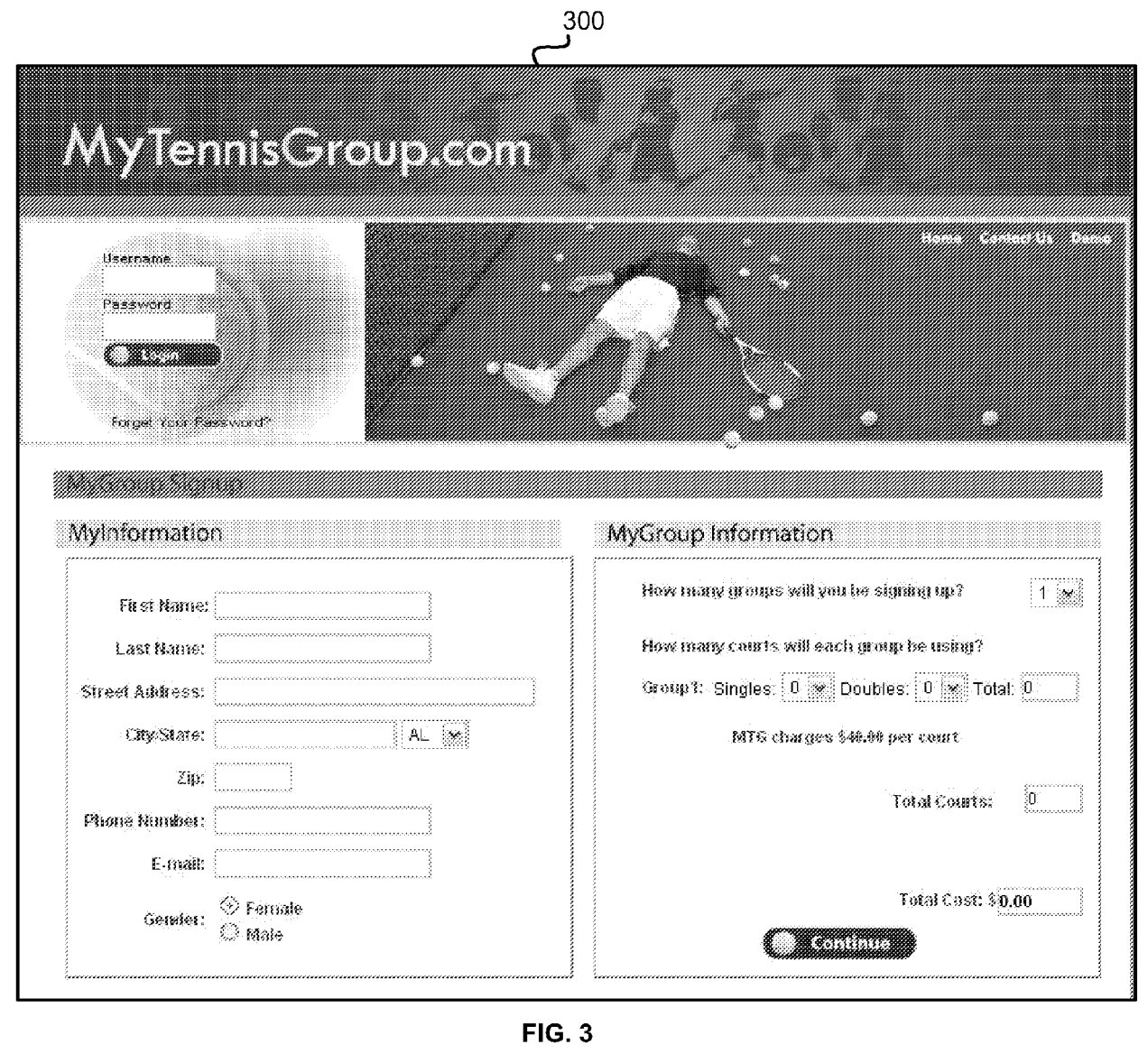
Figure 5A:
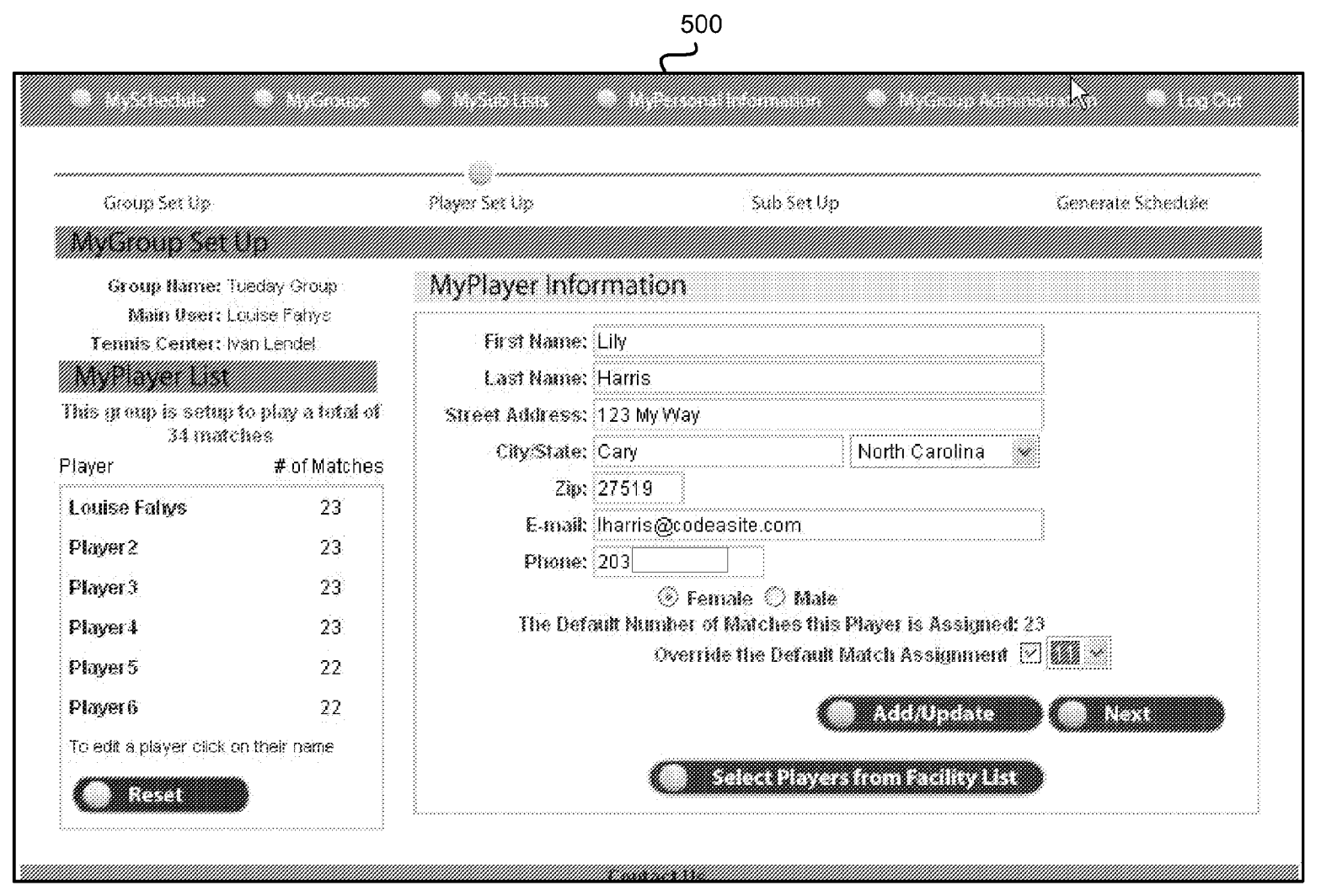
Figure 5B:
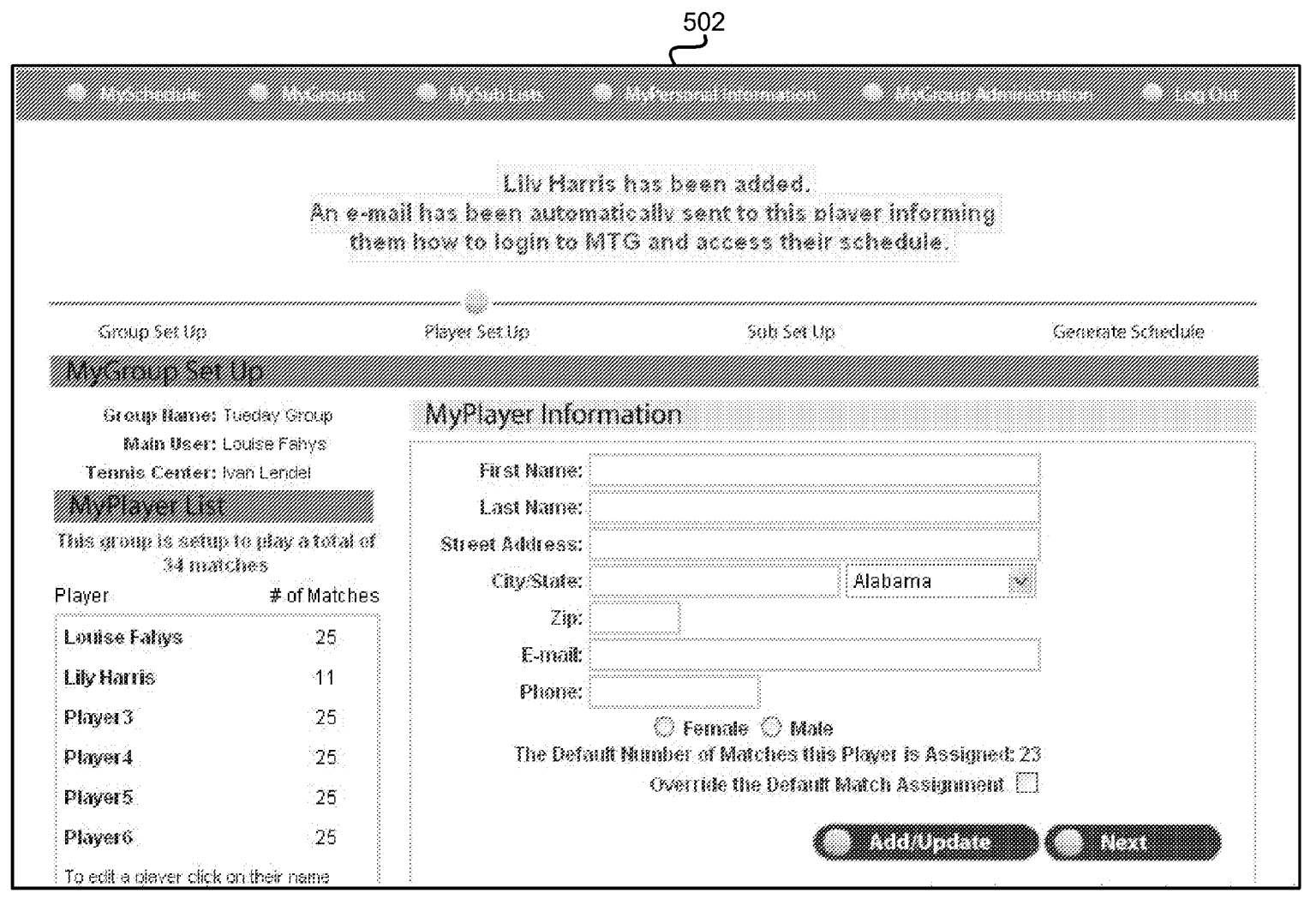

FIGS. 3-7C illustrate exemplary user interface displays generated by the system shown in FIG. 1 for setting up a sports group.

FIG. 8 illustrates an exemplary event reminder generated by the system shown in FIG. 1.

FIGS. 14A-16B illustrate exemplary user interface displays generated by the system shown in FIG. 1 for requesting and scheduling a substitute player.

FIGS. 17A-17E illustrate exemplary user interface displays generated by the system shown in FIG. 1 for proposing a group event.

Figure 18A:
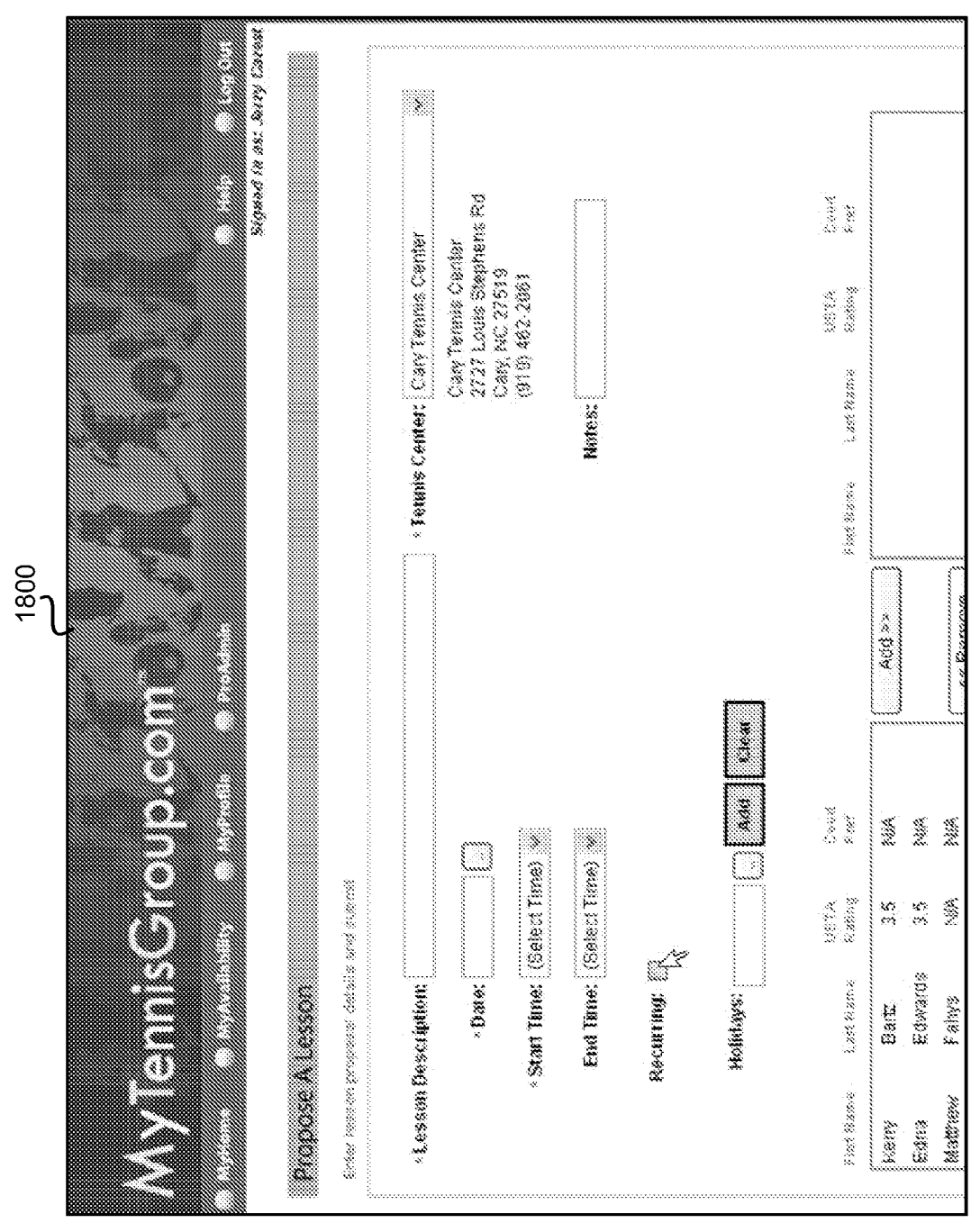

FIGS. 18A-18D illustrate exemplary user interface displays generated by the system shown in FIG. 1 for proposing a group event.

DETAILED DESCRIPTION OF THE INVENTION

Figure 1:
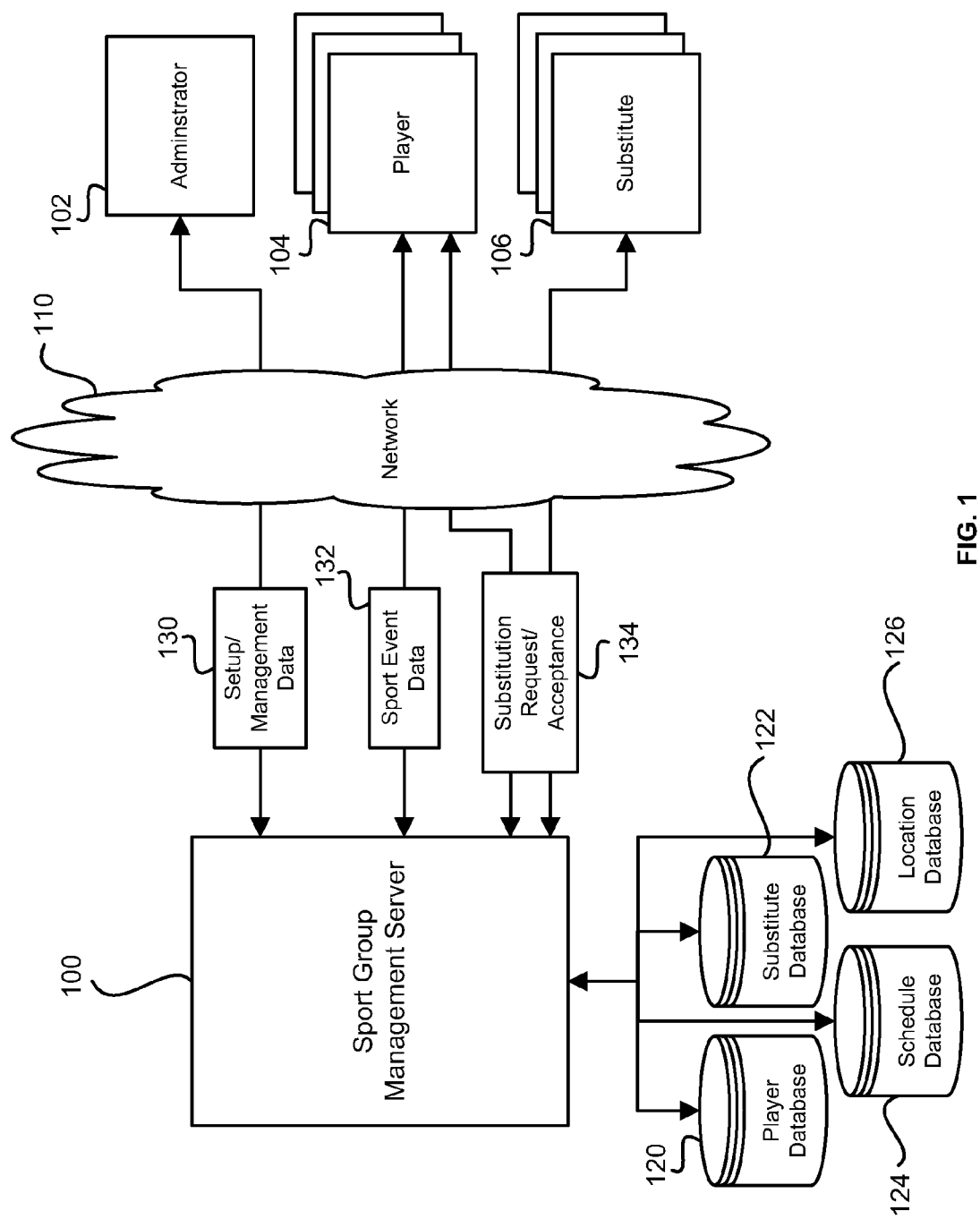
FIG. 1 is schematic diagram of a system for managing a sports group according to an exemplary embodiment of the present invention.
Figure 2:
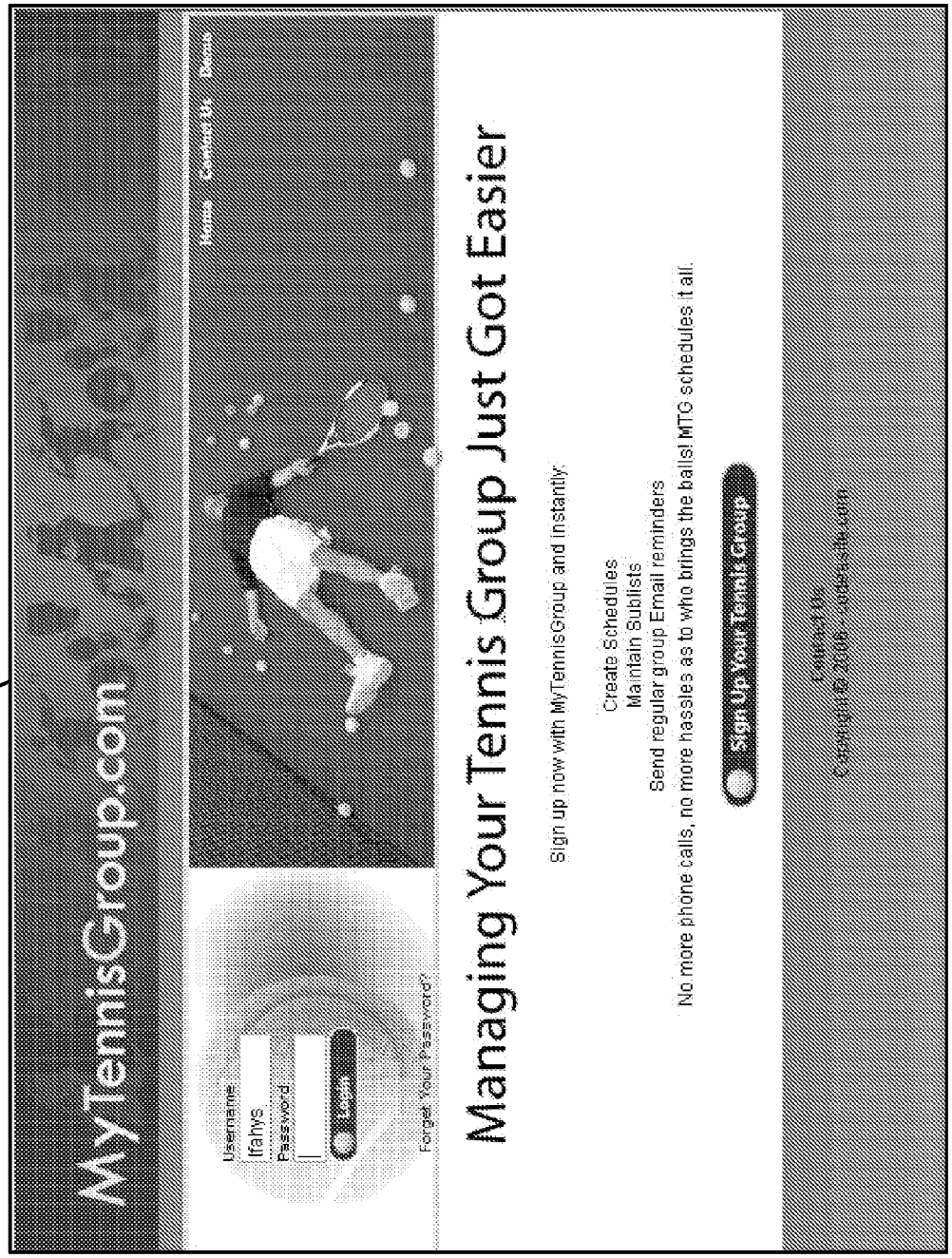
FIG. 2 illustrates an exemplary user interface generated by the system shown in FIG. 1.

FIG. 1 shows a system for managing a sports group (e.g., and/or activity or game group) according to an exemplary embodiment of the present invention. The system includes at least one sport group management or administration server 100. The server 100 (e.g., UNIX server) is accessible by any number of group administrators 102, players 104 and substitutes 106 via a communications network 110 such as the Internet. The server 100 includes software for generating a user interface 200 for sending and receiving data with the administrators 102, players 104 and substitutes 106. In one embodiment, the user interface 200 is an interactive website (see, e.g., FIG. 2) generated using one or more of hypertext markup language ("HTML"), hypertext preprocessor language ("PHP") and JavaScript. However, any other language and/or tool may be used (e.g., flash, XML, etc).

The system includes any number of databases (e.g., MySQL databases) in communication with the server 100. The databases include, for example, a player database 120, one or more substitute (e.g., substitute player) databases 122, a schedule and/or match database 124, and a location (e.g., match location/facility) database 126.

As shown in FIGS. 3-5E, a group administrator 102 may access the user interface of the system via the communications network 110 to set up his/her group. The group administrator 102 may be, for example, a team or group manager or captain, a player in the particular group, an instructor, and/or an administrator or manager of a sports facility (e.g., tennis center). Based on the group data or information provided, the system will quickly generate a group schedule. The administrator 102 first provides setup/management data 130 (e.g., group data) to the server 100 regarding his/her group or groups. The setup/management data 130 may include contact information for the administrator, a sport (e.g., or activity or game), type of play (e.g., singles, doubles, etc.), and a number of courts and/or fields required. The administrator 102 may further provide a Group Name and a location (e.g., a tennis center) where events (e.g., matches or lessons) will be played. The system may also suggest or determine a location (e.g., from the locations database 126) based on proximity to the administrator 102. For example, the system may perform a zip-code lookup of all the locations (e.g., tennis centers) in the location database 126 within a range (e.g., 20 miles) of the administrator 102.

The location database 126 may include information regarding a plurality of play locations. For example, the location database 126 may provide the administrator 102 with holiday and/or event dates for the particular locations. If the location at which the group will play at is not listed, the administrator 102 can enter a custom location data including any holiday dates the location may have. The scheduler will then not schedule match play on a holiday date or date of a previously scheduled event.

Figure 4A:
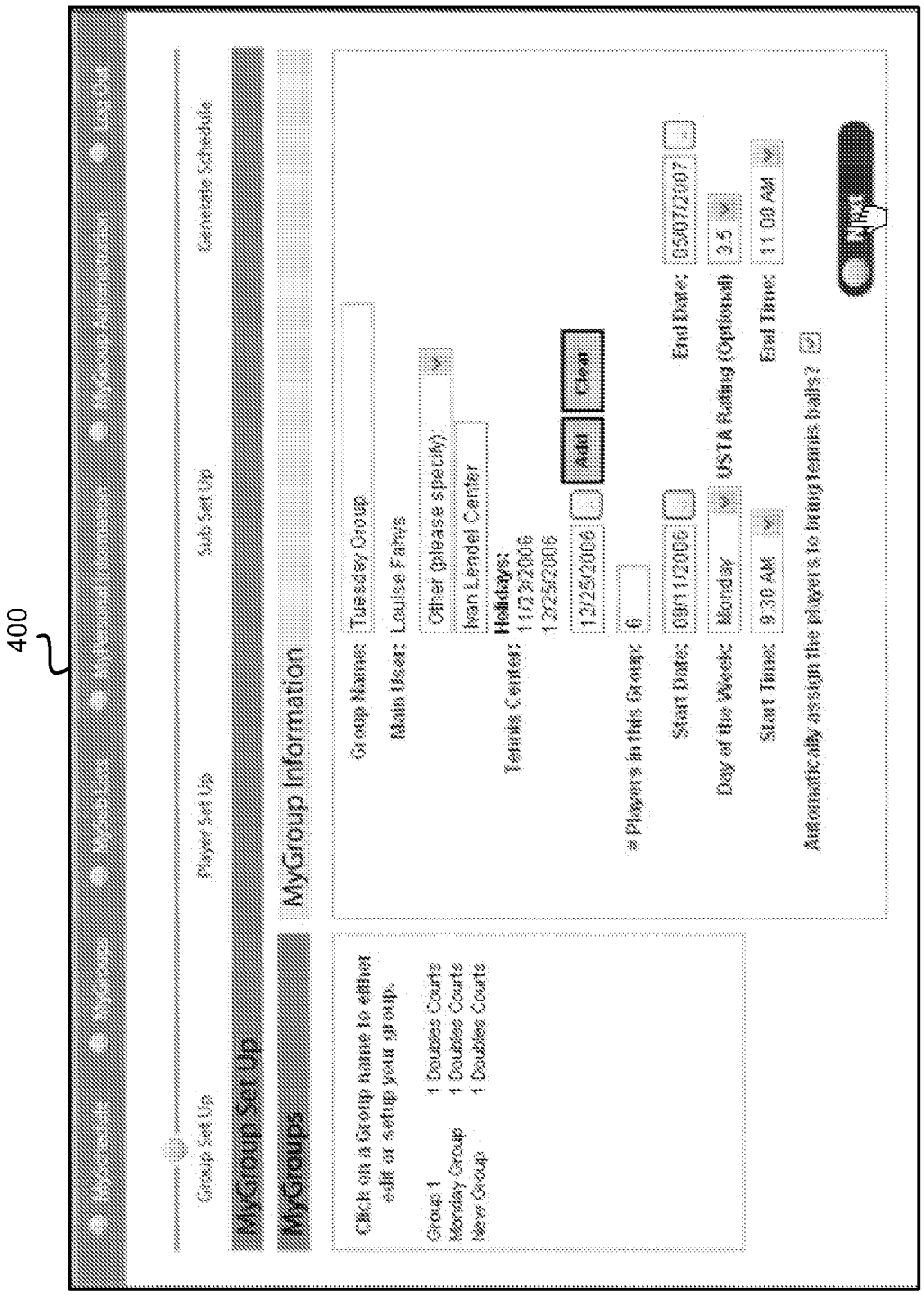
Figure 5C:
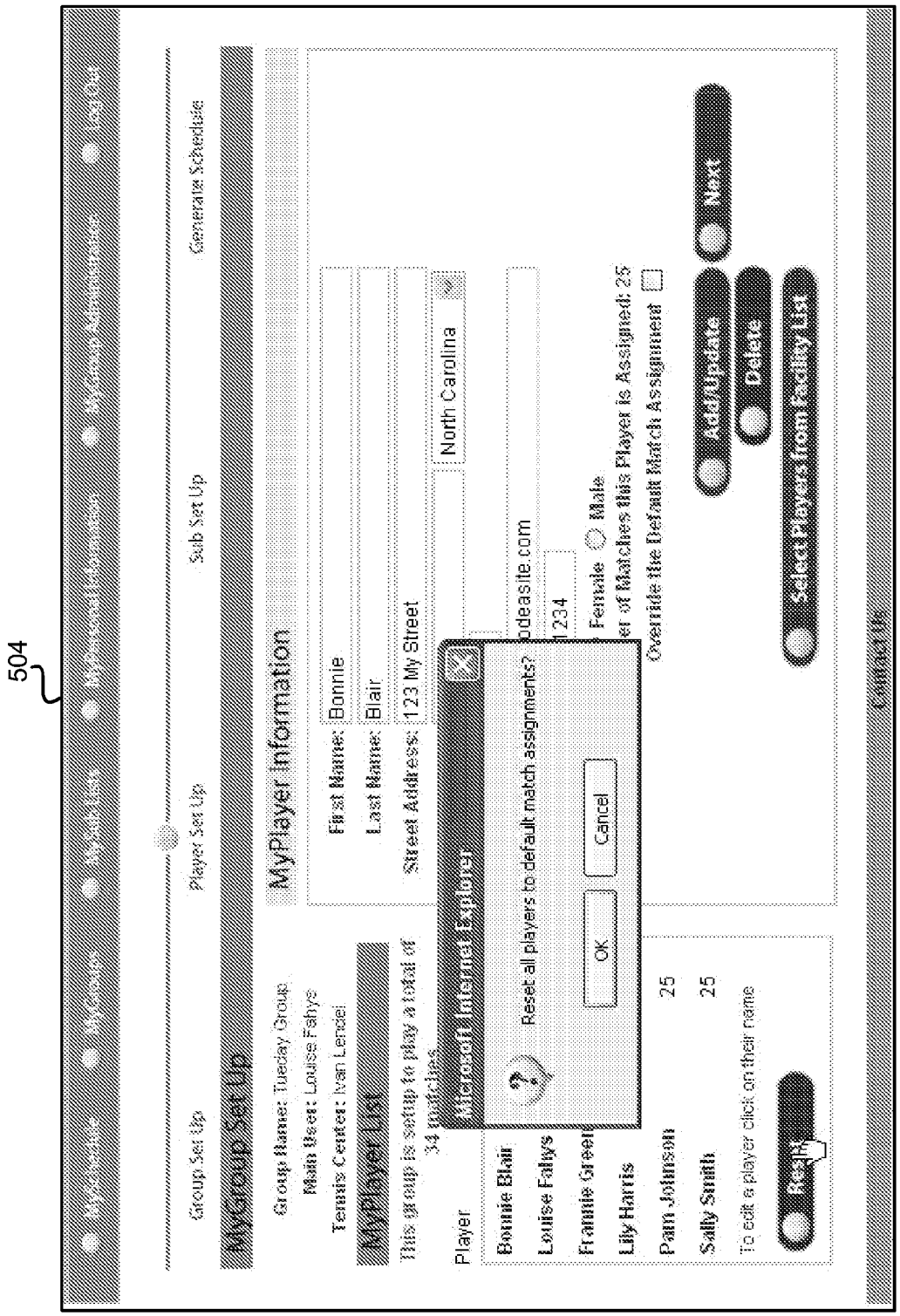
Figure 5D:
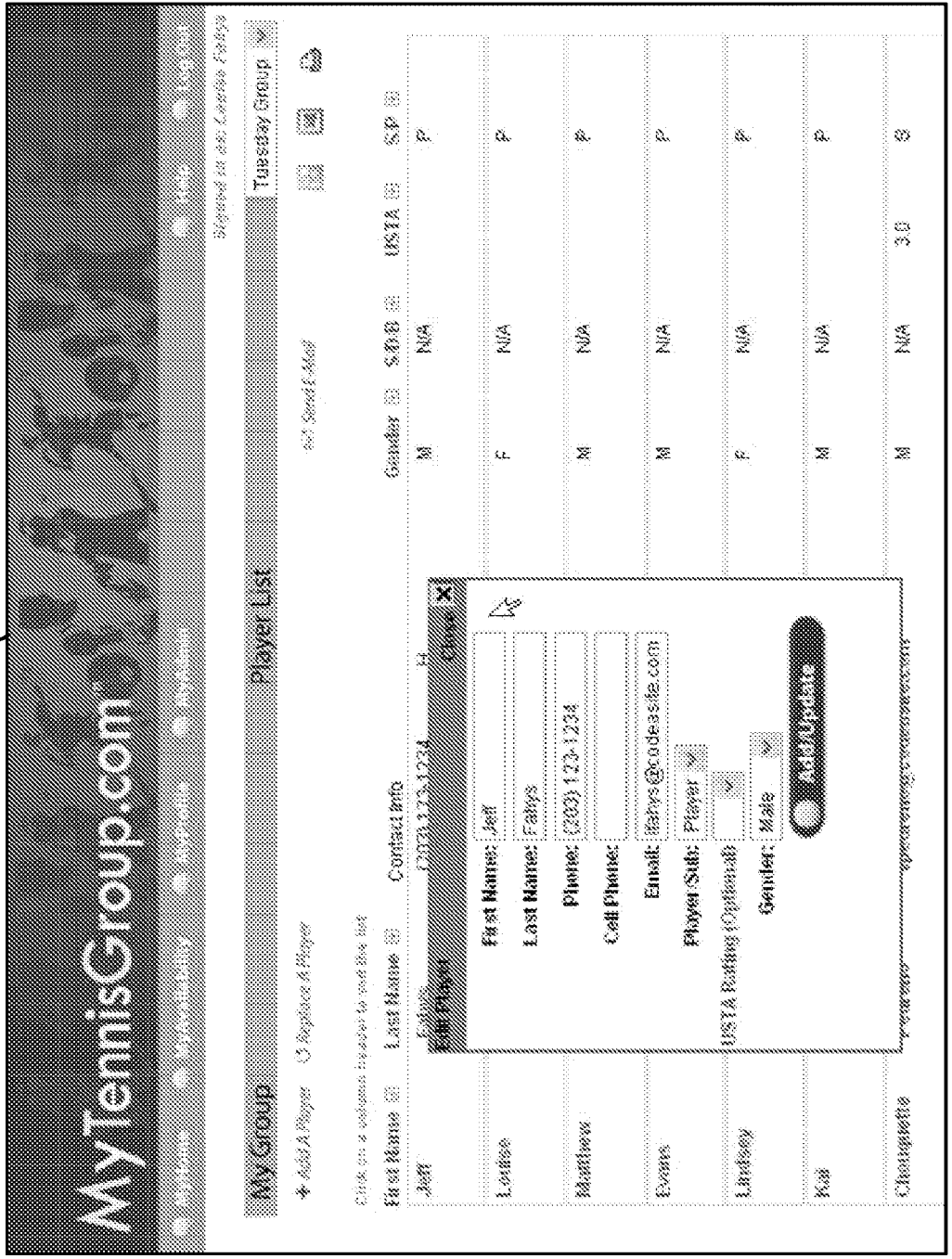
Figure 5E:
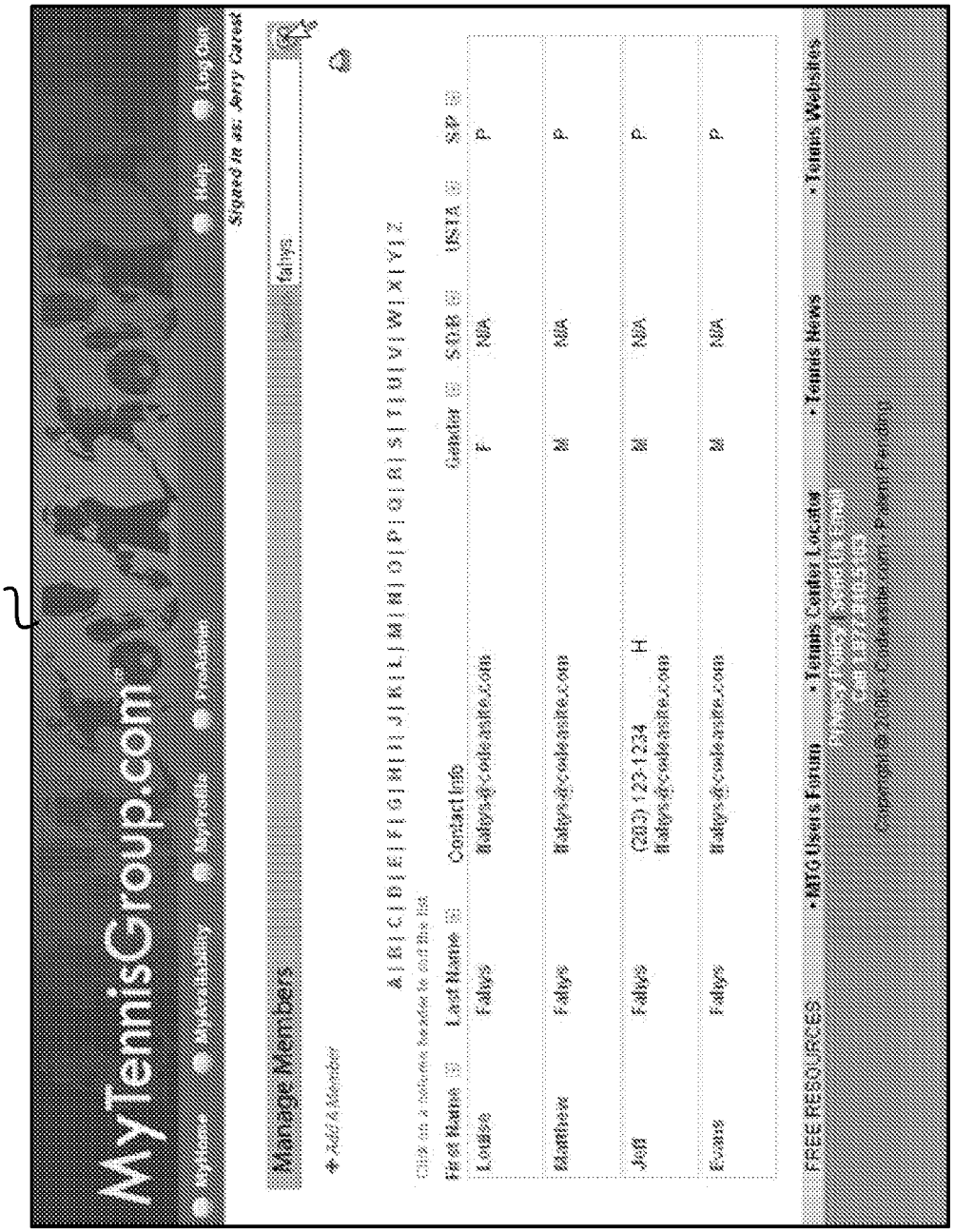

As shown in FIGS. 4A-4B, the administrator 102 further provides the number of players participating in the group, gender of the group (e.g., for matching appropriate substitutes), a group rating (e.g., U.S. Tennis Association rating), a group start date, and a group end date. One or more times and weekdays for play may also be provided.

The group manager 102 is presented with the number of matches their group will play. This number is calculated using the group start and end dates and eliminating any holiday dates. By default, the number of matches is divided equally between all the players in the group. If the matches do not divide equally extra matches are randomly assigned to the players. The group manager 102 may override the default match assignments and assign a player to play a specific number of matches. Once this assignment is made the scheduler automatically re-divides the remaining matches equally among the remaining players. Error checking is provided to notify the group manager if he/she has made too many or not enough match assignments.

Figure 6A:
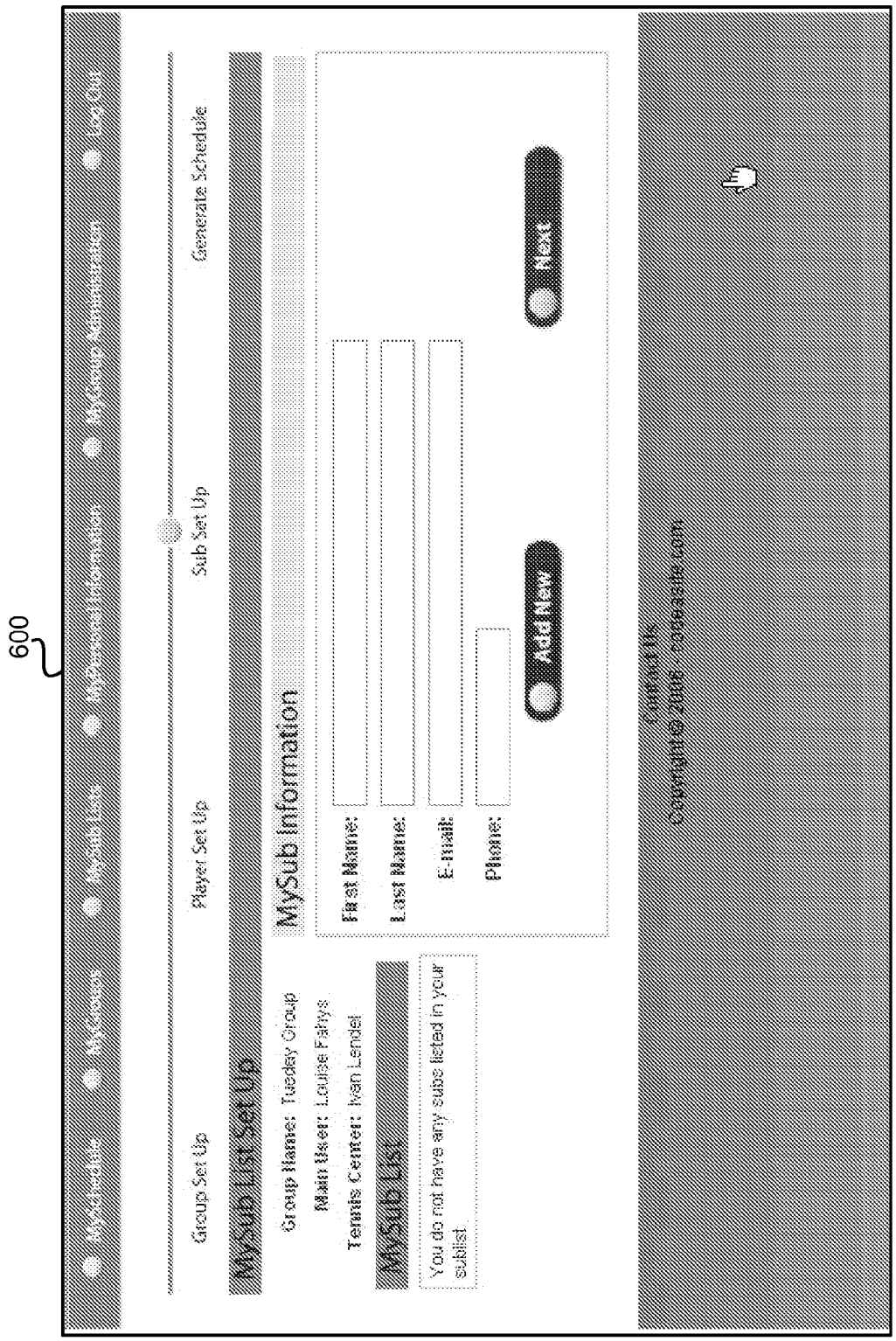
Figure 6B:
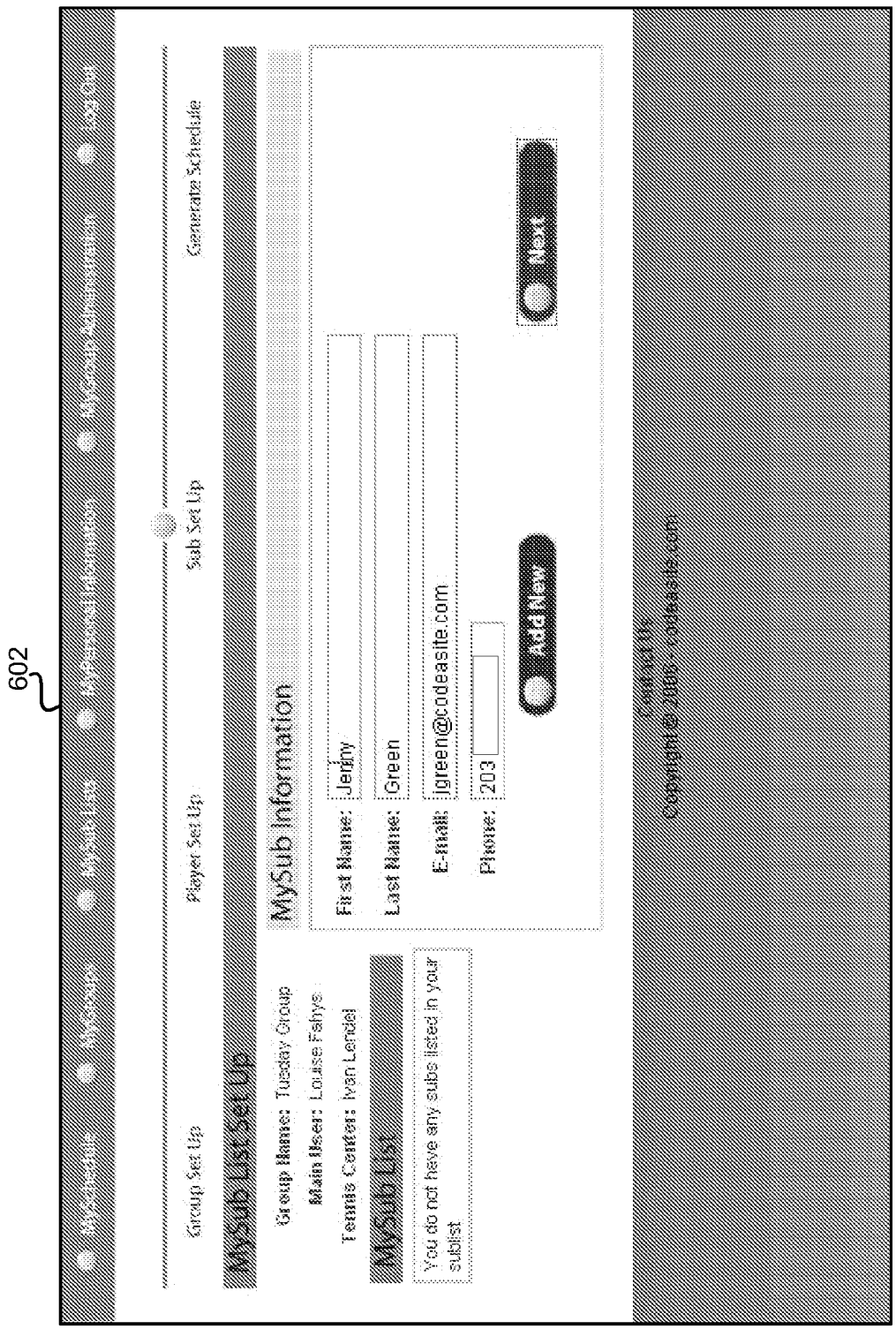

As shown in FIGS. 5A-5E, a first name, last name, gender and/or email address may be entered to generate a new player account for each player in the group. Phone number and address information may optionally be provided. A text or SMS address may also be provided. To aid in communication, this information is displayed to all players within a group on the "My Groups" page. As shown in FIGS. 6A-6B, substitutes may also be added to the substitute database 122 or a preferred substitute list of the group. However, the substitute database 122 may include any number of eligible substitutes.

Figure 7A:
Figure 9A:
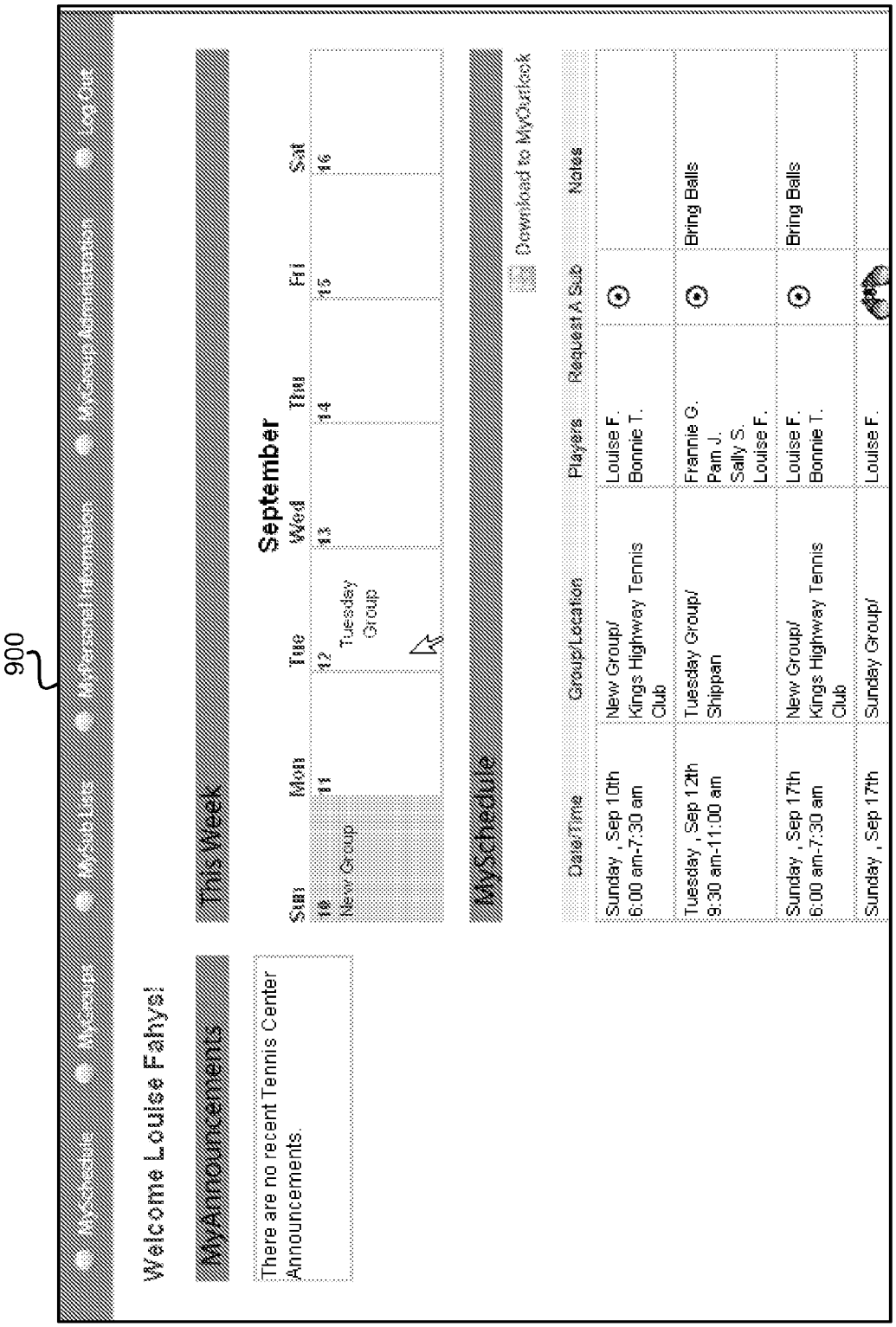
FIGS. 9A-13 illustrate exemplary user interface displays generated by the system shown in FIG. 1 for a particular player of a sports group.
Figure 9C:
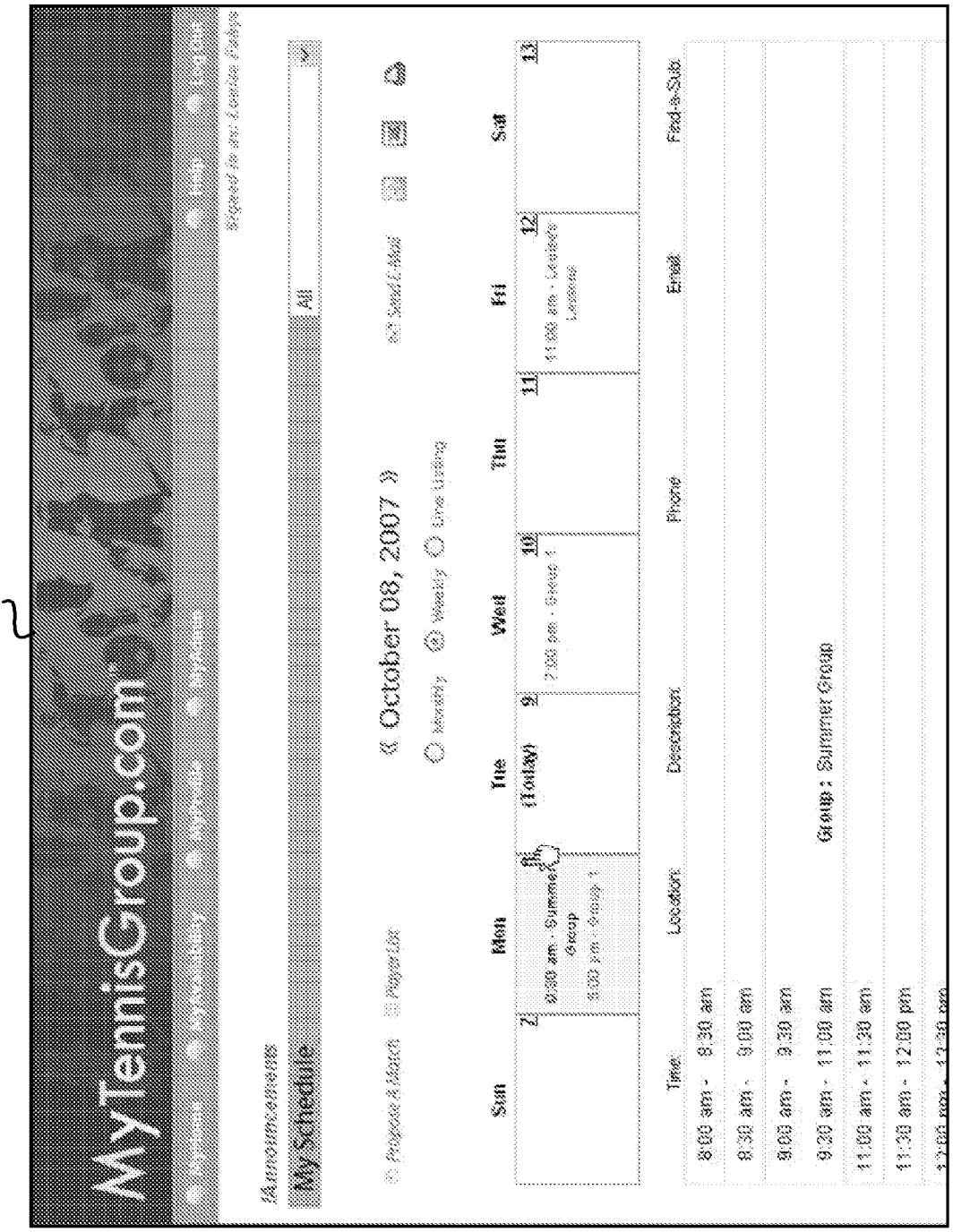
Figure 10:
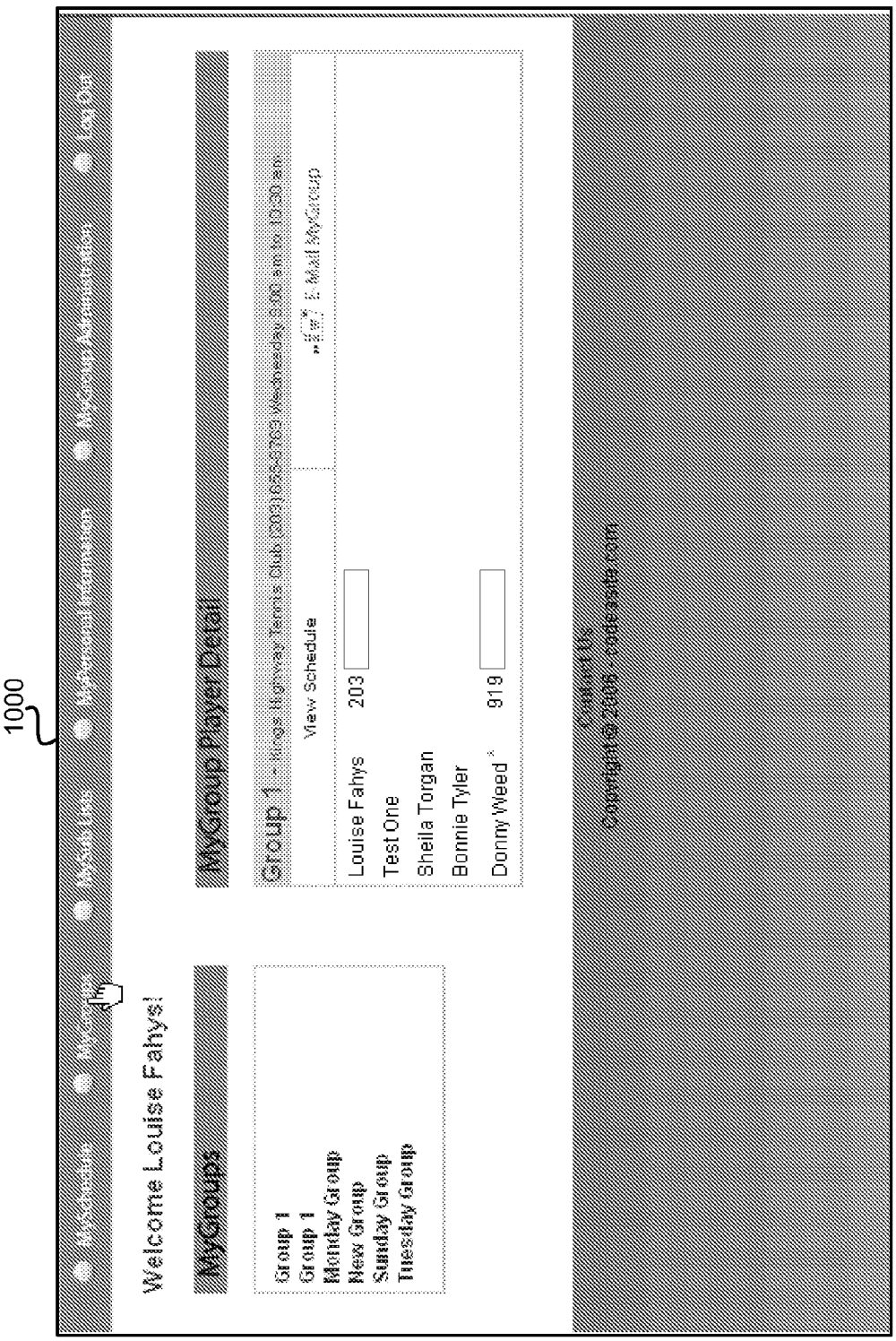
Figure 11B:
Figure 12A:
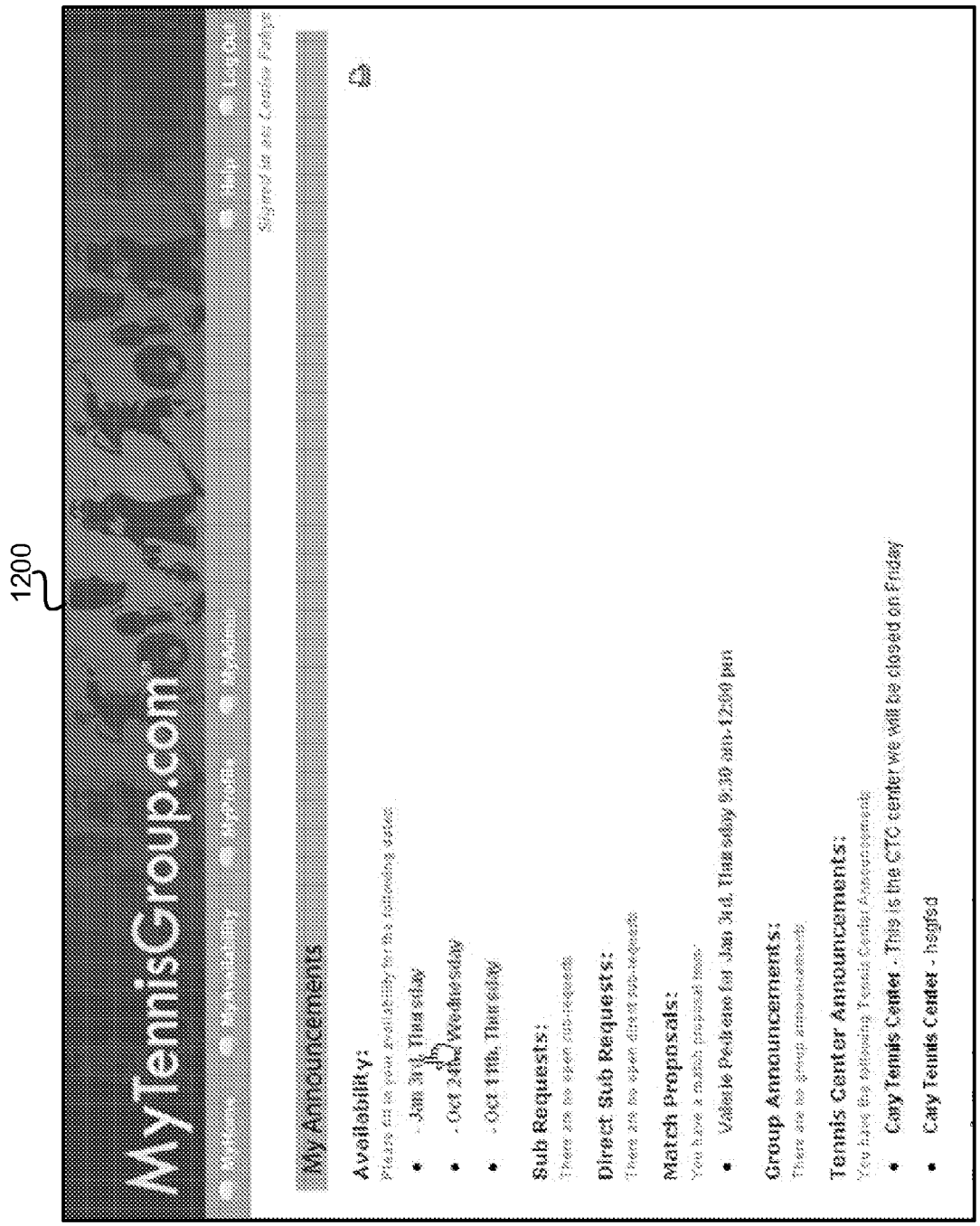
Figure 12B:
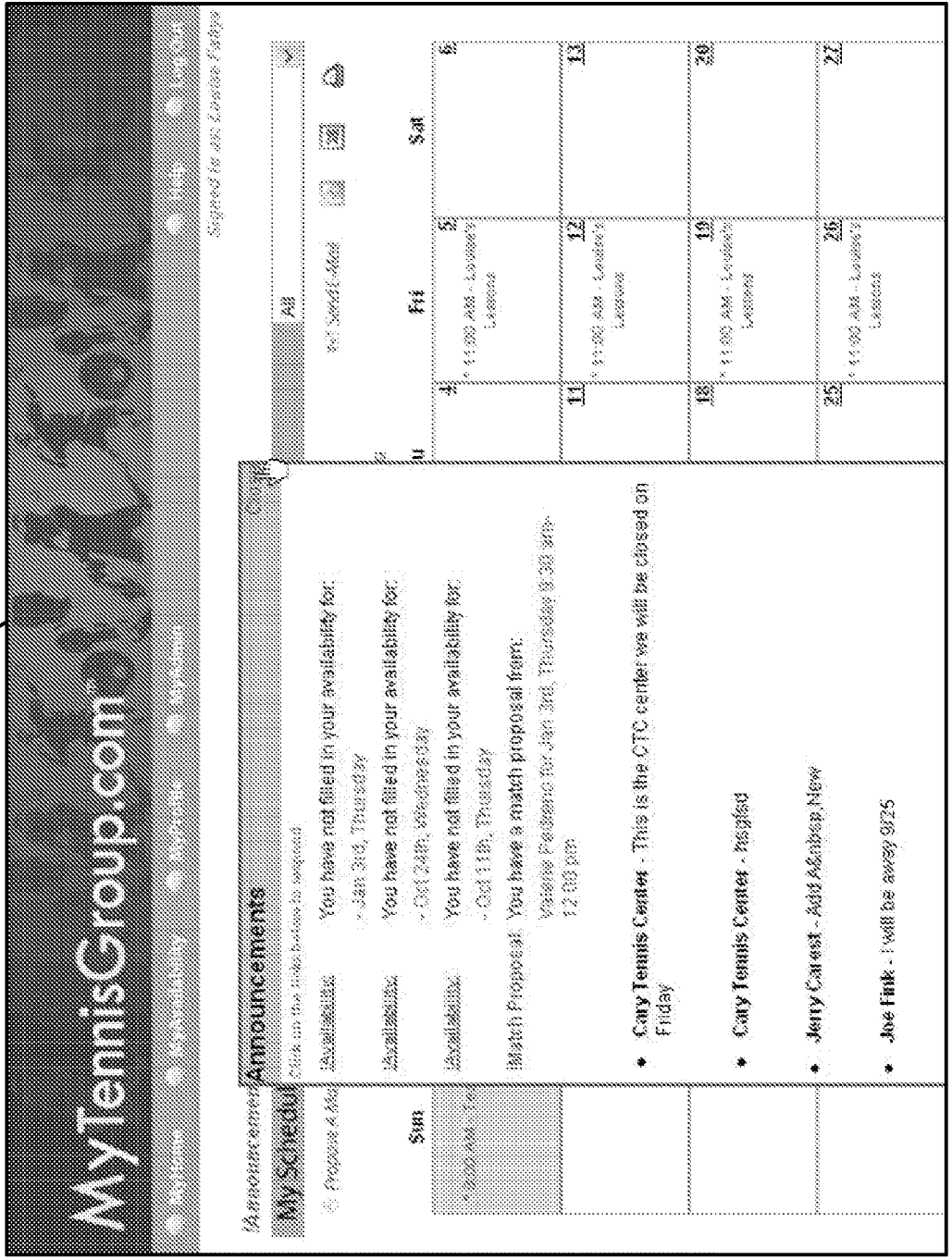
Figure 13:
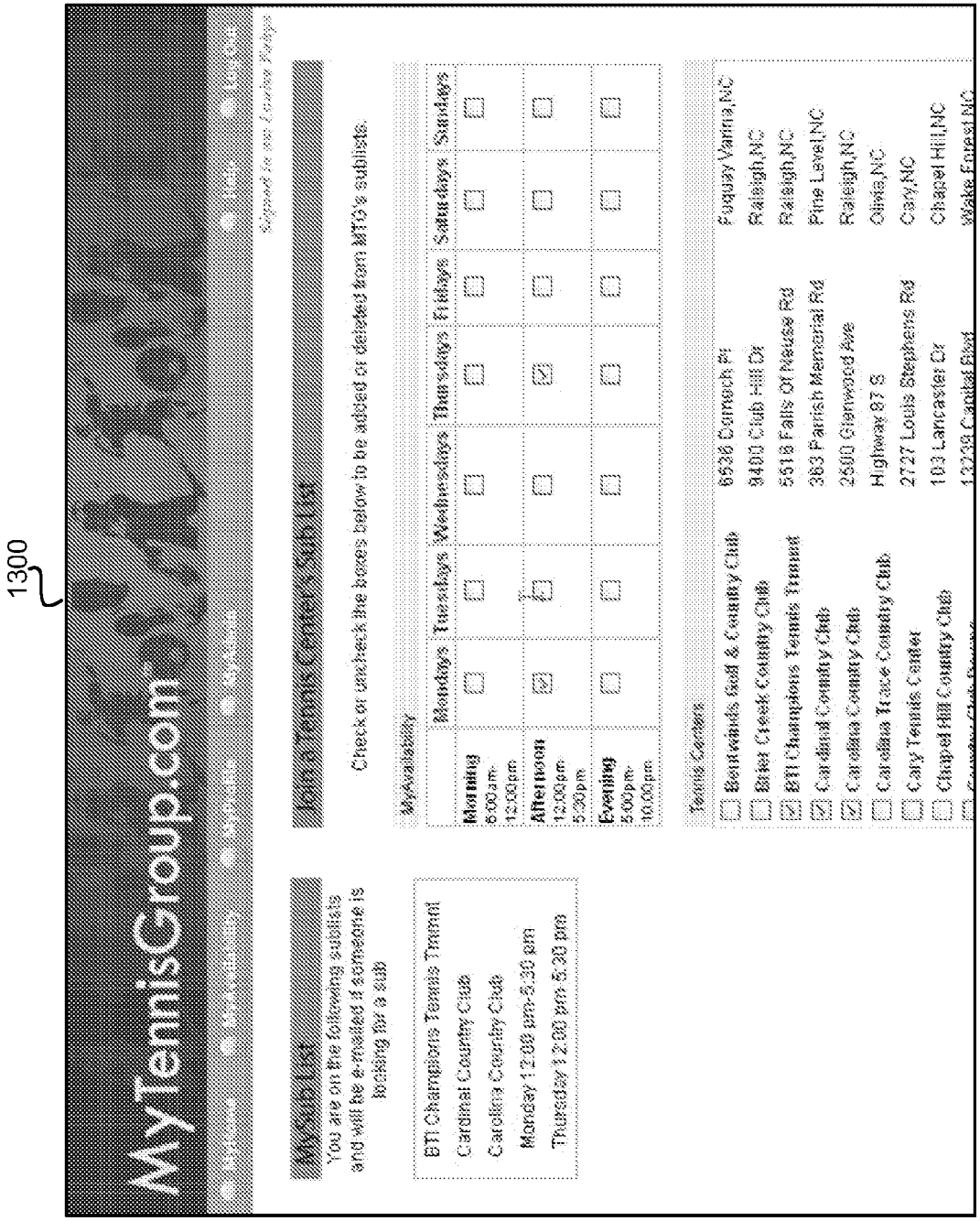

After the player information has been provided, a group schedule is automatically generated by the system and stored in the schedule database 124 (see, e.g., FIGS. 7A-7C. The administrator may view the setup/management data 130 to verify its accuracy. Once they are satisfied they may click on a "generate schedule" button. This button invokes a scheduler to generate an interchangeable partner group schedule for the group (e.g., tennis group). The scheduler takes the number of matches assigned to each player into account and as evenly as possible places them into the schedule. Where possible, it also rotates the players so that each player plays against and with every other player. If the "assign players to bring tennis balls" option is checked off the scheduler also evenly assigns which players should bring tennis balls to each match. The system may then generate regular e-mail or text message reminders or messages to players based on the schedule (e.g., using a command run on UNIX scheduler ("CRON")). An exemplary email reminder 800 is shown in FIG. 8.

In some embodiments, the system provides reminders and/or messages to participants by telephone. For example, the system may include a voice over Internet protocol ("VoIP") module in communication with the server 100. Participants or players within a group may then receive telephone reminders about sub-requests and scheduled match play (e.g., prerecorded messages, voice mails, and/or interactive communications using voice recognition). Participants may also choose the types of reminders or messages they wish to receive (e.g., email, text, SMS, and/or telephone).

As shown in FIGS. 9A-13, each individual player in the group receives an account to access the server 100 via the user interface. By accessing his/her account, a player may view a personalized event schedule (e.g., match play, lessons, etc.) which includes matches for all groups the player is a member of, download their personalized schedule into Microsoft Outlook or any other calendar application, view the schedule for each group they are a member of, view group announcements (see, e.g., FIGS. 12A-12B), view contact information for all the players in their group(s), and update their own contact information and reminder preferences. A player may also send a request for a substitute player at the click of a button, e-mail their group, and sign-up on substitution-lists for times they are free (see, e.g., FIG. 13).

FIGS. 14A-16B show exemplary displays for generating a substitute request and scheduling a substitute. All players can request substitute players for match dates or lessons that they can not make. A substitute request may also be submitted by a player, administrator or instructor to fill a lesson (e.g., tennis lesson) which the requestor or another person cannot make.

Figure 14A:
Figure 14B:
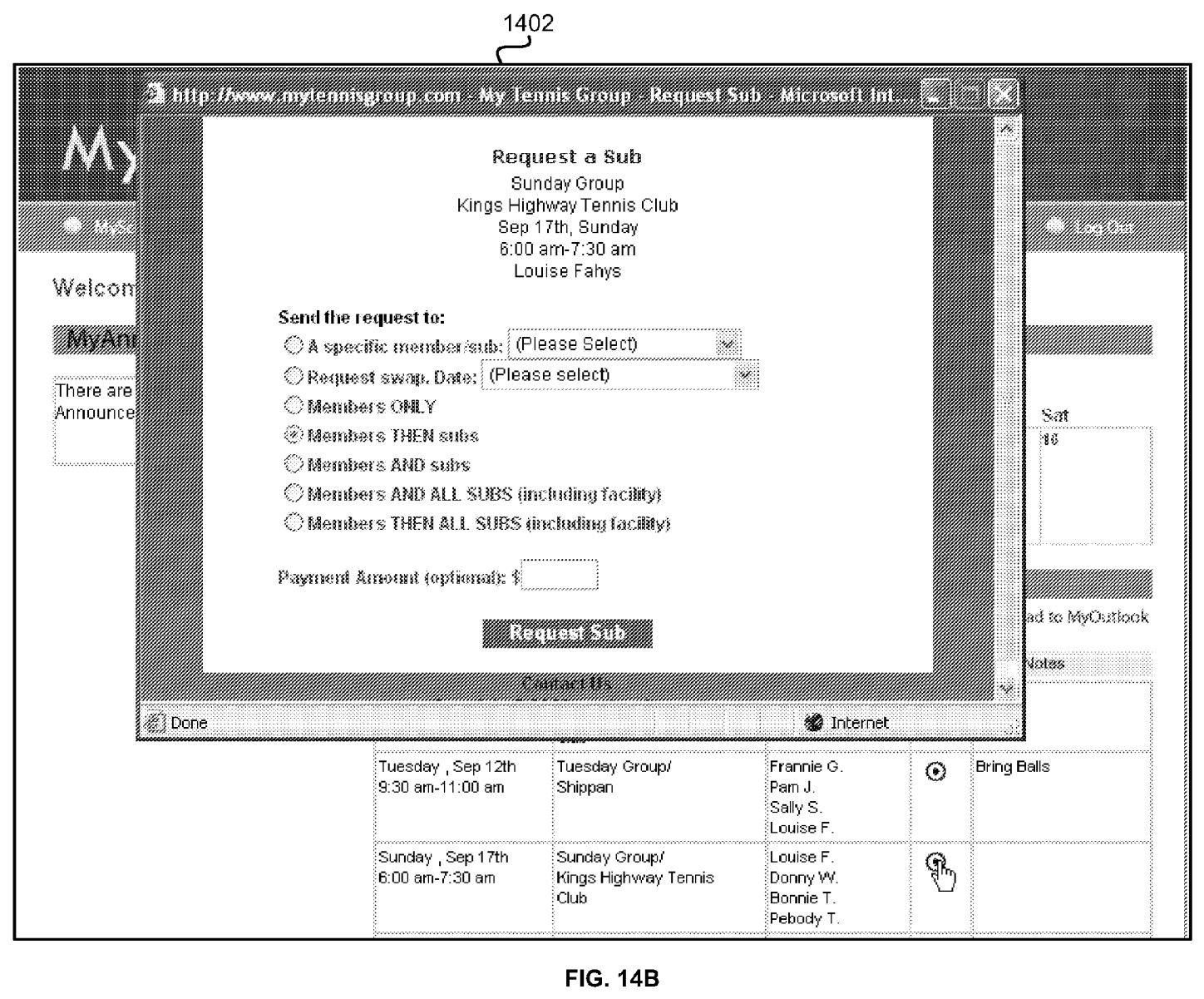

Subs can be requested by clicking on the radio button next to the match date they need a sub for, from the "My Schedule" page (see, e.g., FIG. 14A). This triggers a pop-up window where a player can send a request to a "specific member/sub" (see, e.g., FIG. 14B). This option lists those members and subs not playing on the date they are looking for a sub. Using this option just sends the sub request to a specific player. The player may alternatively send a "request swap", e.g., to all members in the group who are not playing on the day they are looking for a sub. The dates that the other players are available to swap with them are listed in the drop-down box. These dates are dates the requesting player is not playing and could swap with them. The player needing a substitute may also send a substitute request to members only (e.g., members of the group who are not playing on the day they are looking for a sub) or members and substitutes. The latter option sends the request to the members of your group who are not playing on the day they are looking for a sub. If after 24 hours, none of the members have accepted the sub request, the system will send the request to all the subs listed in a group sub list in the substitute database.

Other substitute request options include sending a simultaneous request to members of the group and all the players on the group sub list who are not playing on the day they are looking for a sub. Further, a request may be sent to members and all substitutes (e.g., all the players signed up on the facility sub list or within a predetermined range who are available to play and have the same USTA ranking and gender as the group). This request may be sent simultaneously to the members and substitutes, or first to members and then substitutes after a predetermined delay. In some exemplary embodiments, players may sign up to be potential substitutes at one or more locations (see, e.g., FIG. 13). Specific dates and times at which the player is available may also be provided.

Figure 15A:
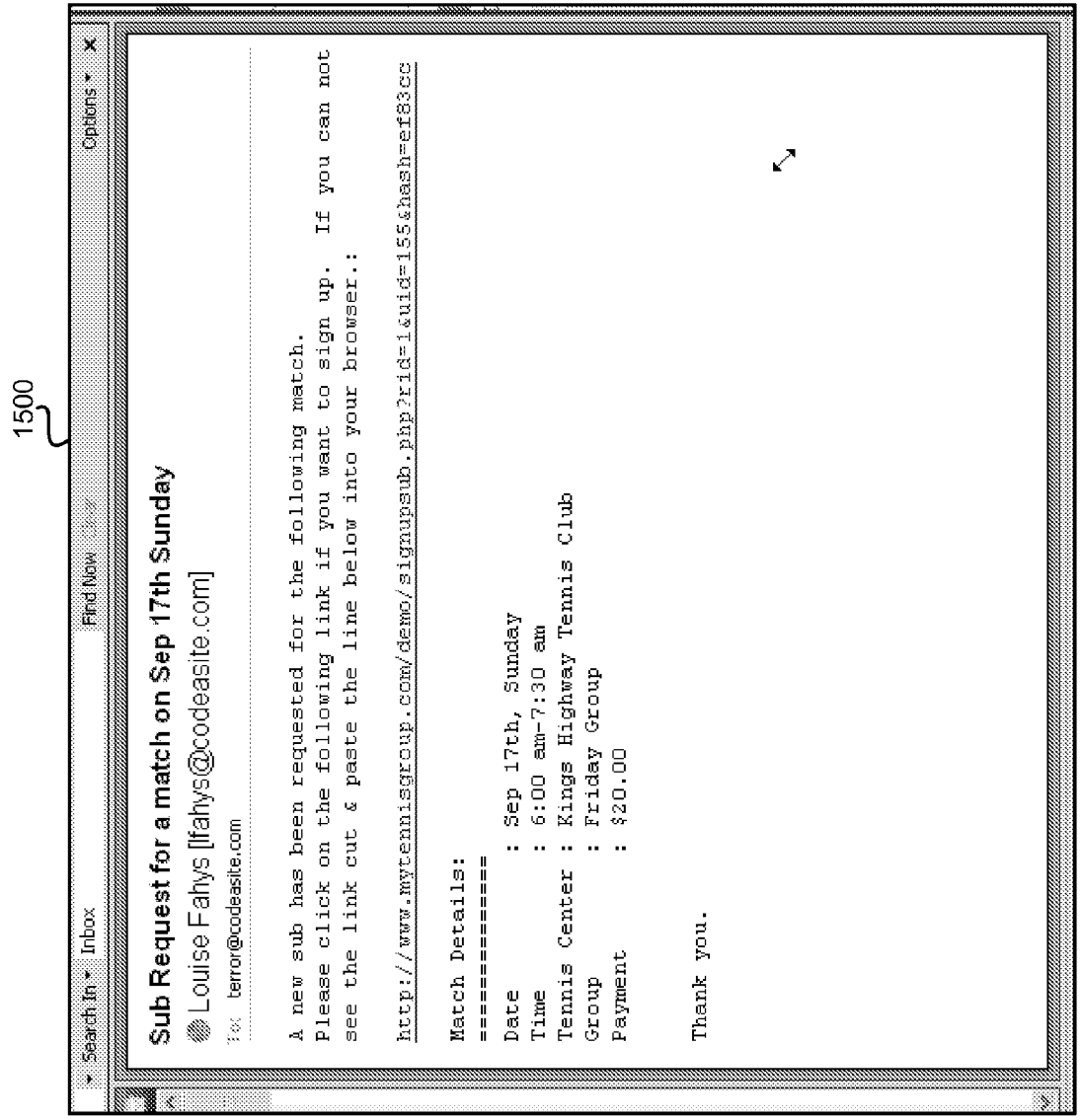
Figure 16A:
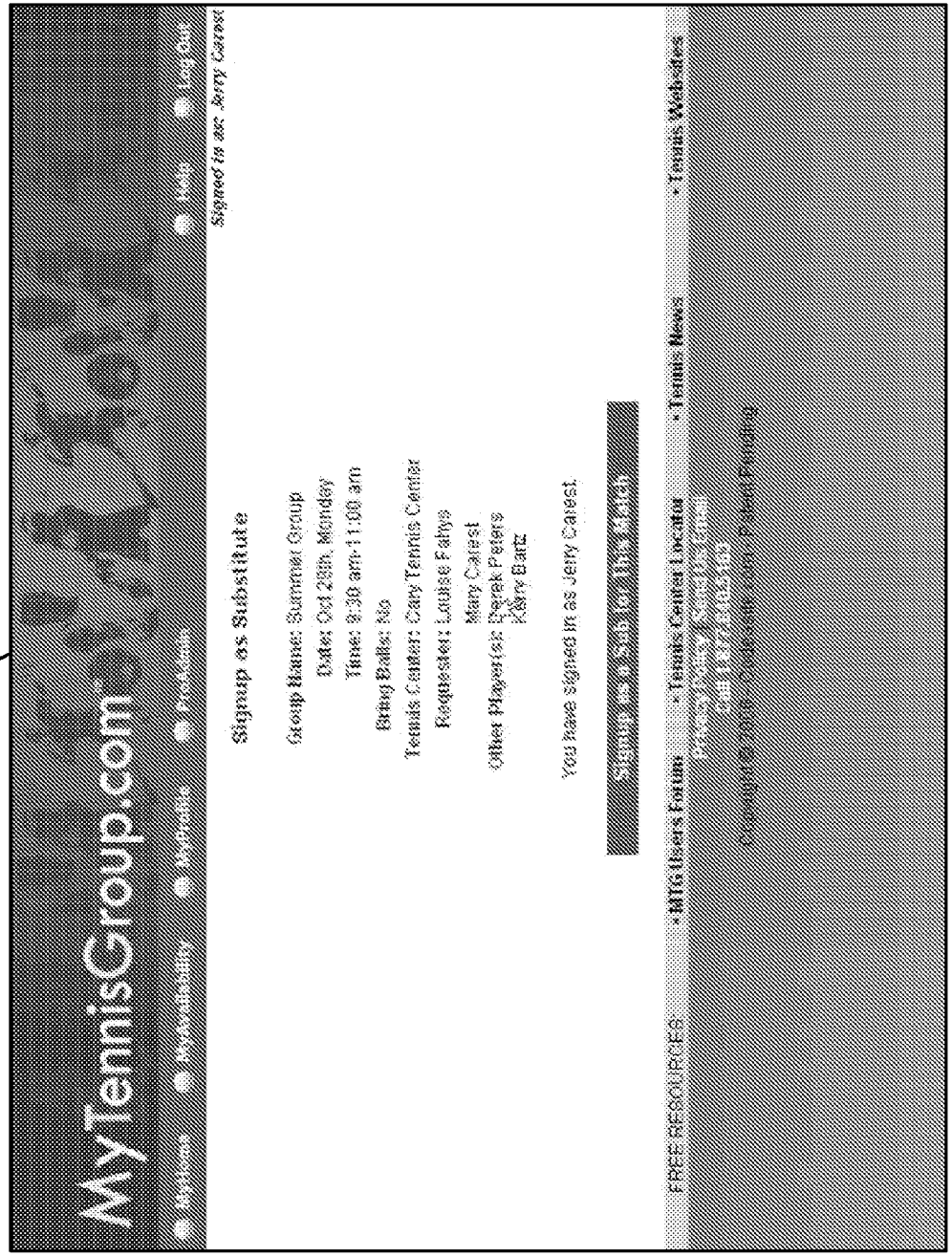
Figure 16B:
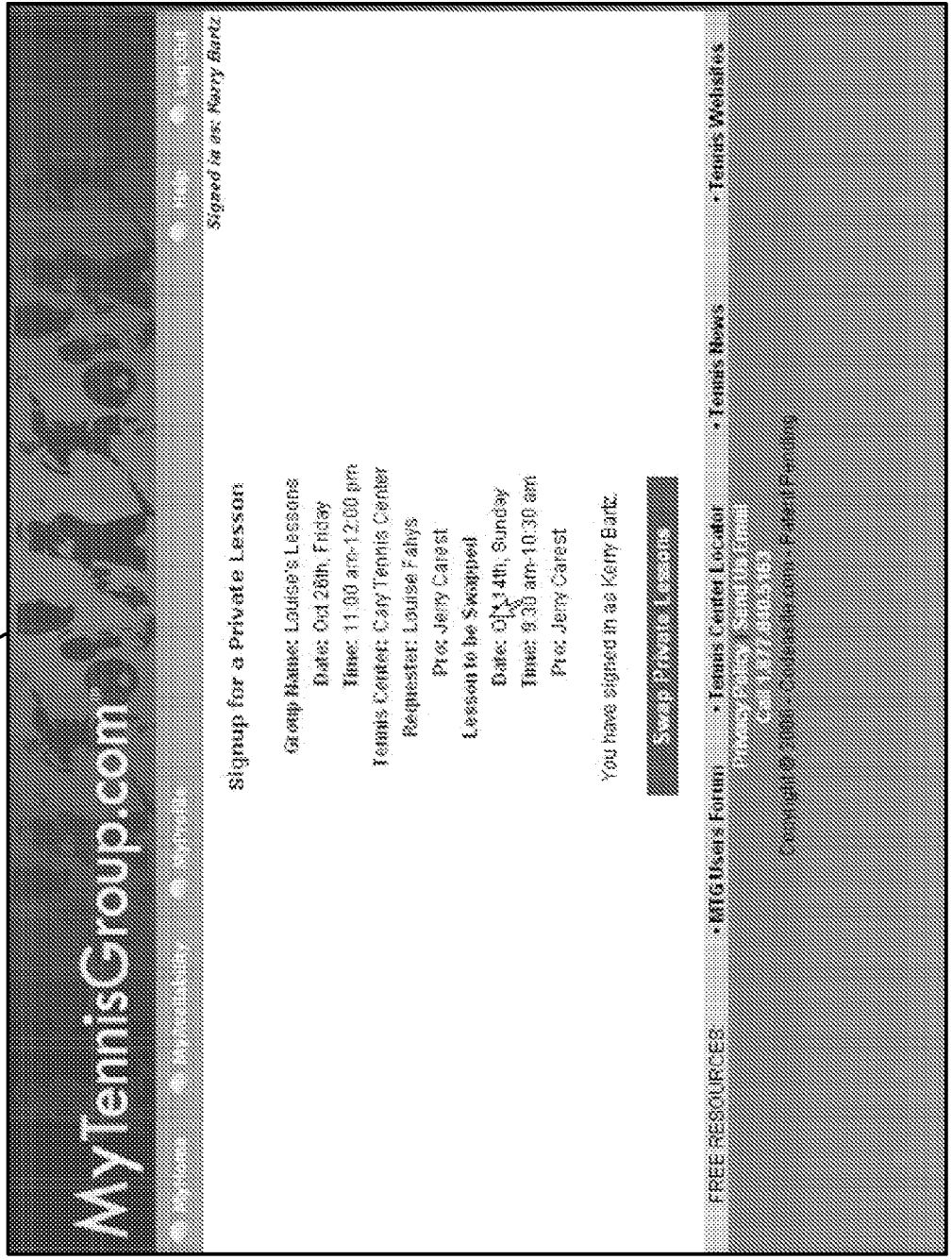

Sub-requests may be sent from the e-mail address of the person requesting the substitute (see, e.g., FIGS. 15A-15B). Players can accept a sub-request by clicking on a link within the e-mail and then clicking the accept button (see, e.g., FIGS. 16A-16B). If the sub-request has already been filled, they will get a message saying sub request filled, thank you for your interest. The personal and group schedules will be updated with the substitute players name so all the members of the group can see who is expected to play. The requesting player will receive an e-mail, telephone message, and/or text message when the sub-request has been filled.

Figure 19:
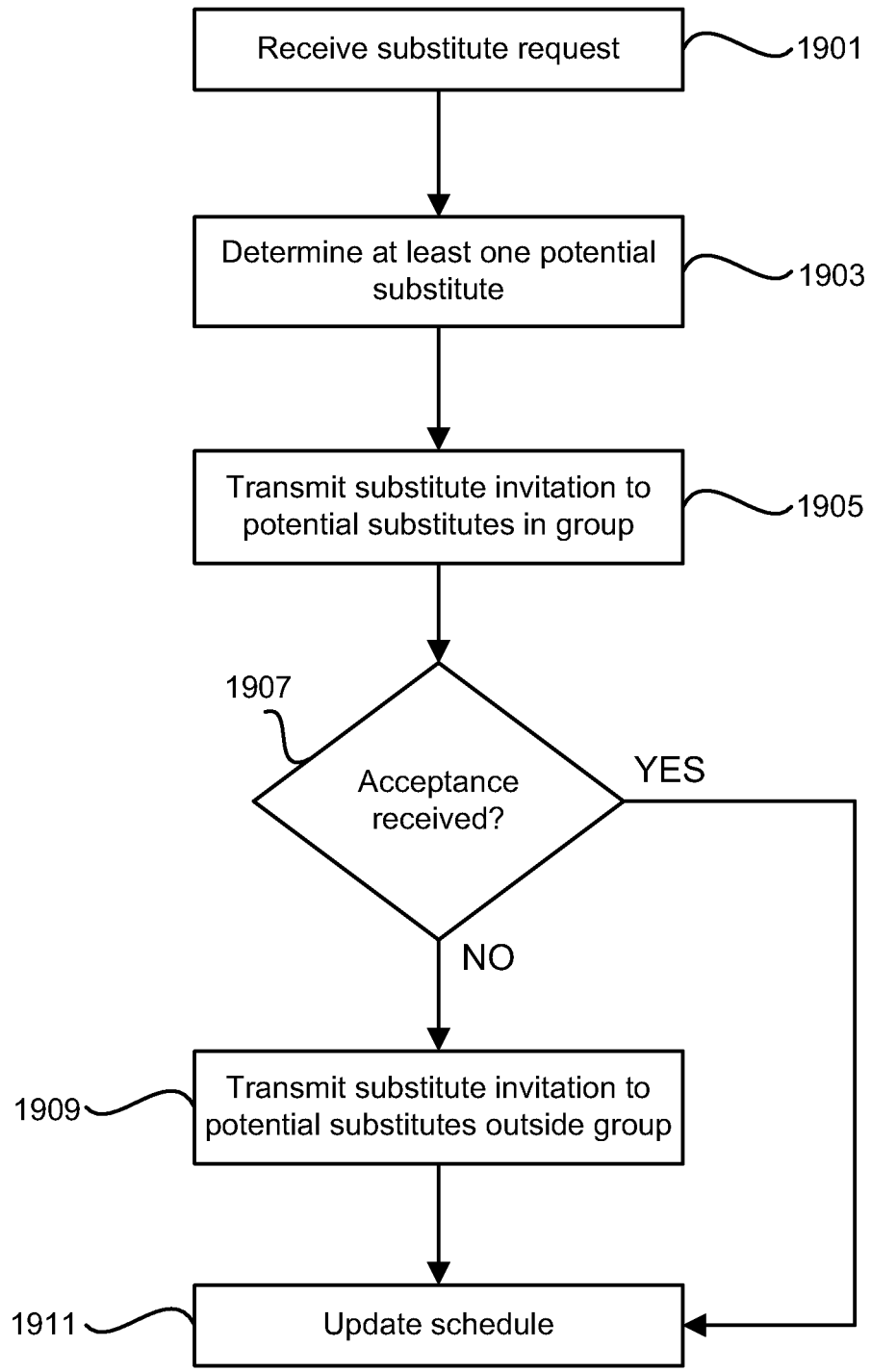
FIG. 19 illustrates one exemplary method of determining a substitute employable by the system shown in FIG. 1.

FIG. 19 illustrates one exemplary method of determining a substitute for a match or lesson. As shown, the system may receive a substitute request (step 1901). The system then determines at least one potential substitute (step 1903). The potential substitutes may, for example, include a particular player indicated in the request, all players in the group, or all players in the group that do not have an event or match scheduled during the requested time. The potential substitutes may also include any substitutes in the substitute database 122 (e.g., of the same gender and approximate USTA rating). In some embodiments, potential substitutes are determined according to one or more substitute rules indicated by the requestor in the substitute request (see, e.g., FIG. 14B). A substitute invitation is then sent out to at least some of the potential substitutes (step 1905). Exemplary substitute requests for a match and a lesson are shown in FIGS. 15A and 15B, respectively. In preferred embodiments, the invitation is first sent to potential substitutes who are members of the group. If an affirmative response is not received within a predetermined amount of time, the invitation is then sent to all other potential substitutes (steps 1907-1909). The invitations may be sent by email, text or SMS message, or by telephone message. Upon receiving an acceptance of the invitation by a first one of the potential substitutes, the system updates the schedule in the schedule database 124 to indicate the new player. Reminders may also be sent out as necessary or desired.

The system also allows administrators or participants to propose a new event to any or all members of the groups he/she is a member of. For example, a match, meeting, or lesson may be proposed. FIGS. 17A-17E illustrate the proposal of a match event by a group member. Using his/her user account, a participant may access the server 100 and provide event information, such as an event date or dates, event start/end times, location and description. The user or the system may also generate and display event options for those participants who accept the event. For example, if someone needed to bring equipment (e.g., tennis balls) to an event (e.g., match), an option is displayed when a user was signing up for the event. An option response field may be free form text. There may also be a checkbox indicating whether the option was required for the event to take place.

A participant may specify particular invitees when creating an event, or choose to invite all members of a group. For example, the participant may be presented with a drop-down list of all the members of the groups the user is a member of to choose from. Minimum and maximum numbers of attendees may further be specified for the event.

Figure 17C:
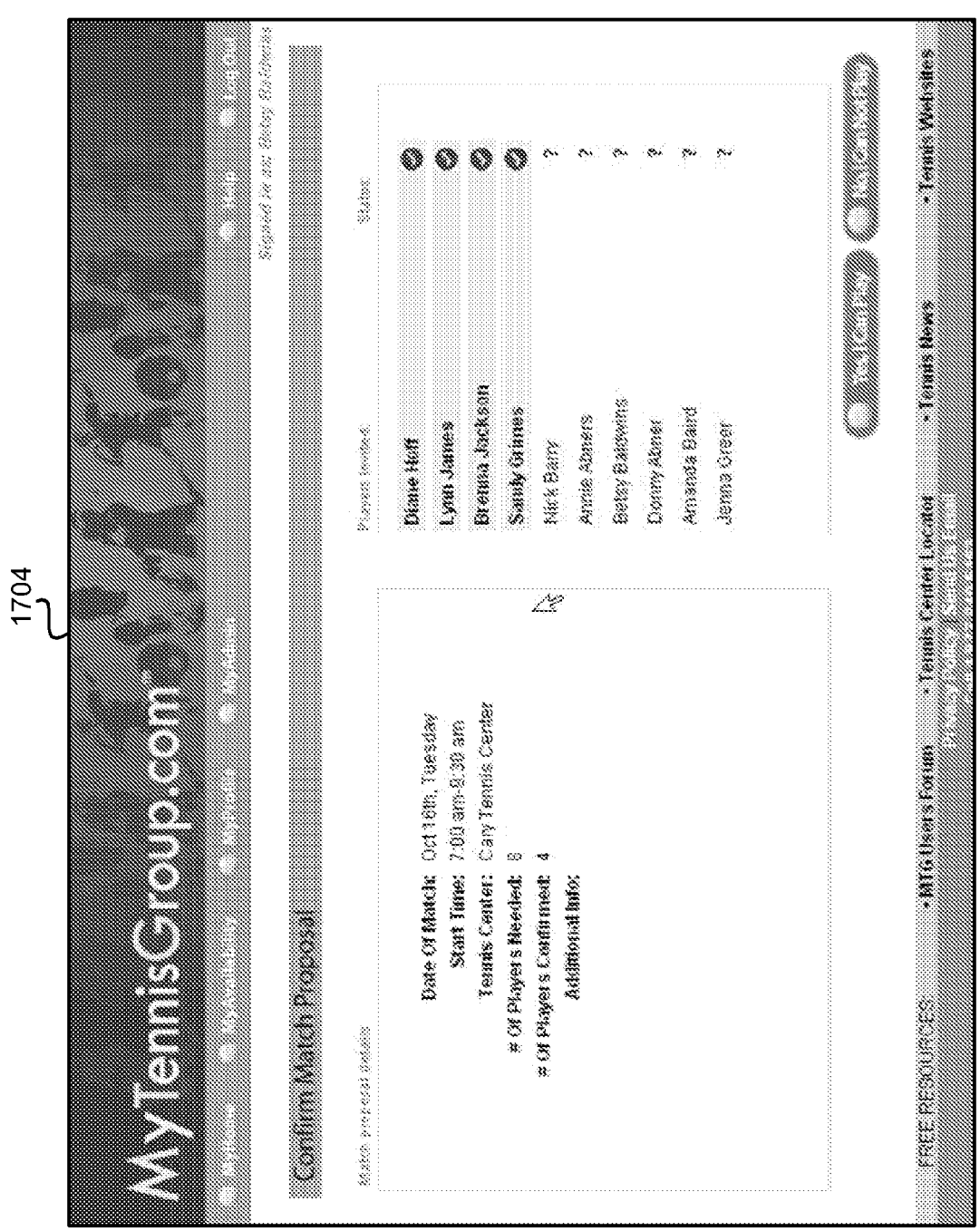
Figure 17D:
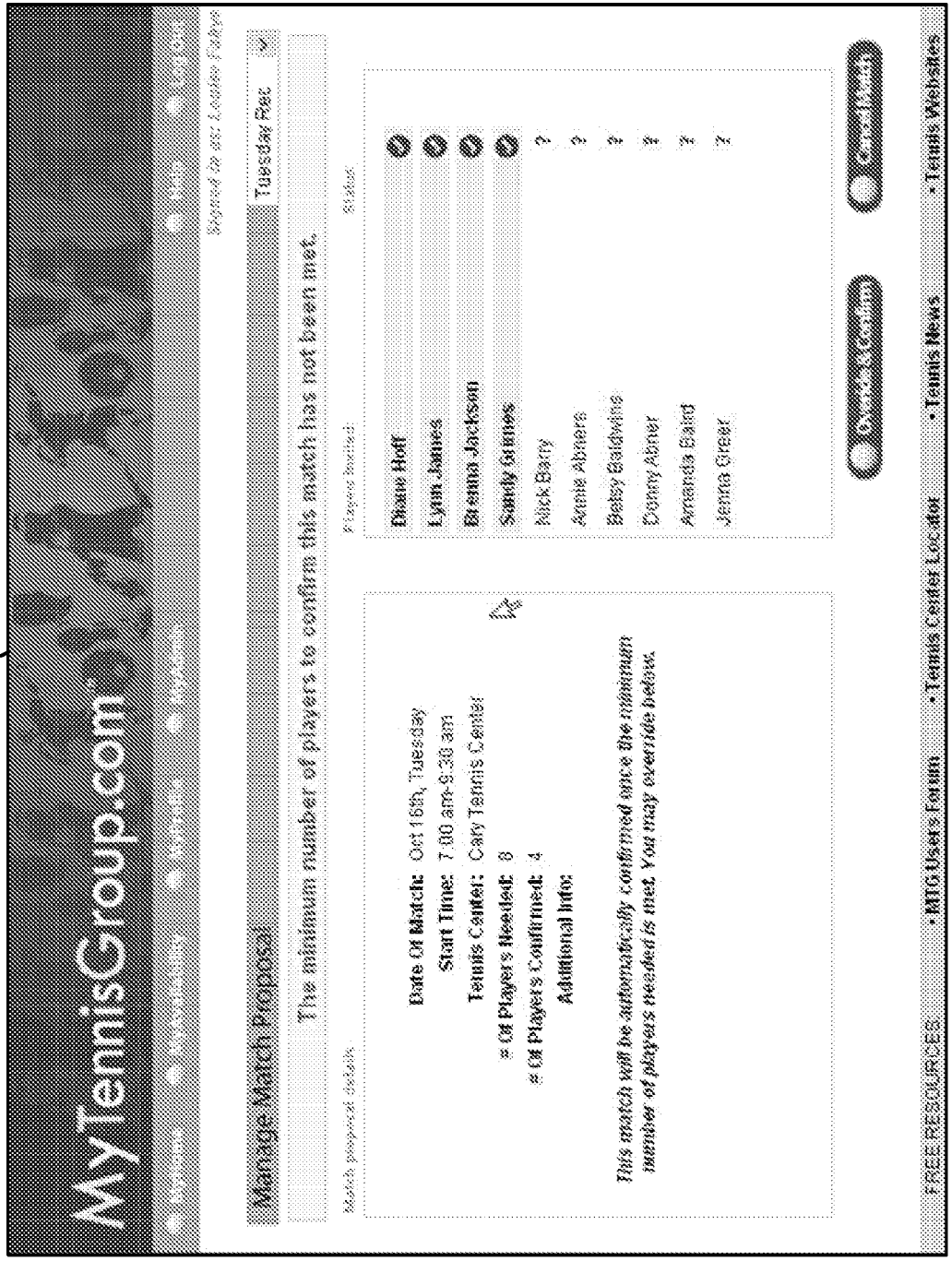
Figure 17E:
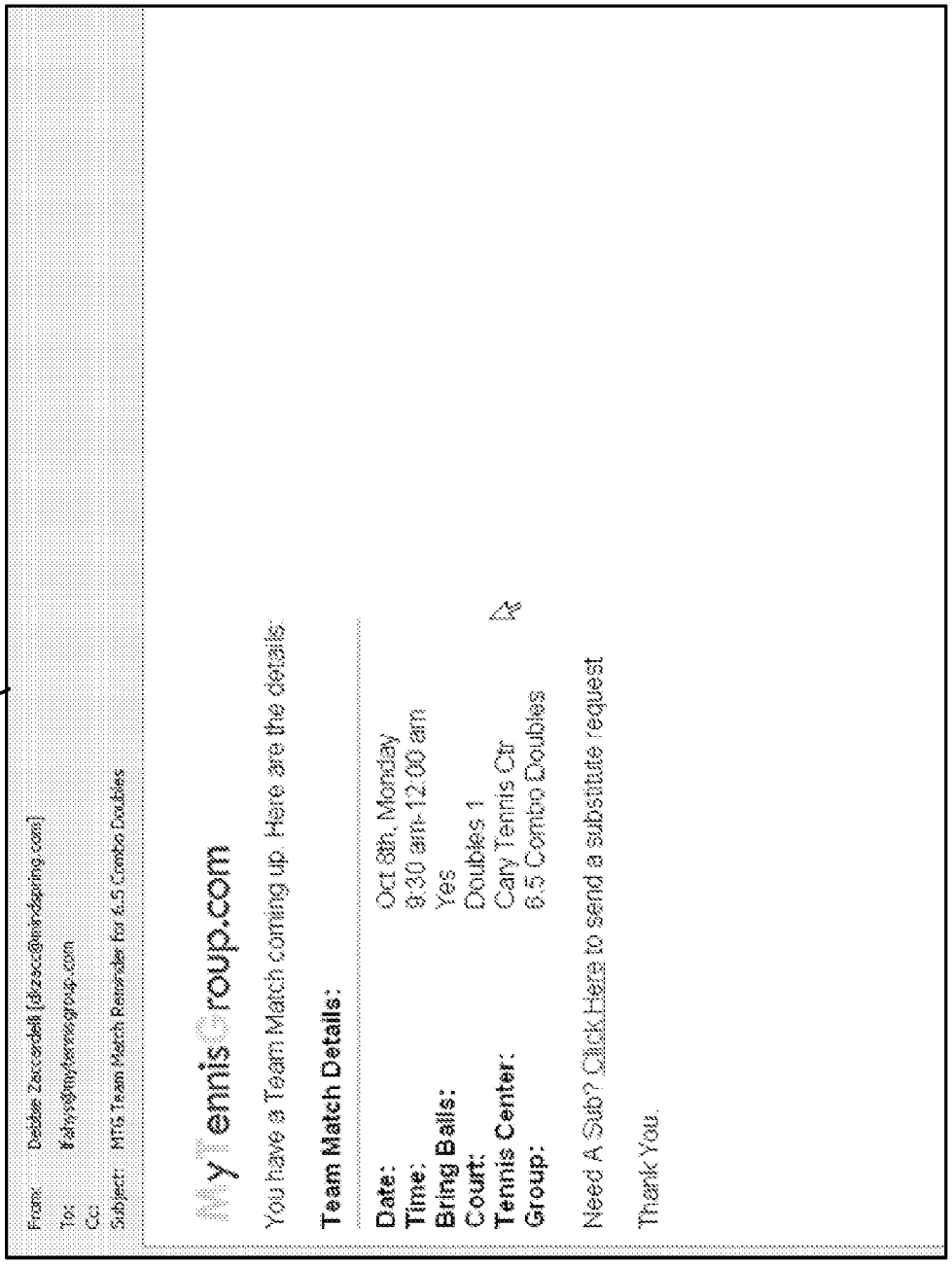

Upon completing the event setup, the user proposing the event may click a "send event request" button and an e-mail describing the event is sent to all selected invitees (see, e.g., FIGS. 17B-17C). A link within the e-mail allows the recipients to sign-up for the event. If there were options (i.e. bring tennis balls) selected during the request, the options are displayed on the sign-up page allowing the recipient to also sign-up for an option. Once an option has been filled, it is no longer displayed on the sign-up page (e.g., for subsequent invitees).

Upon a recipient signing up for a particular event (e.g., by clicking a "sign-up for event button"), any number of actions may be triggered. For example, the recipient's calendar may be updated with the new event. An unconfirmed status may be indicated in a status field of the event until the minimum number of users had signed-up. The calendars of all other users included in the event are also updated. An unconfirmed status reads in the status fields until the minimum number of users sign-up (see, e.g., FIG. 17D).

Once the minimum number of accepted attendees is reached, the status of all the participants is changed to confirmed, and an e-mail is sent to each participant informing them that the event status has changed to confirmed. A predetermined time period before the event is scheduled to take place (e.g., twenty-four hours), a reminder including the event details (e.g., date, time, place & option assignments) is sent out to all participants (see, e.g., FIG. 17E). Further, the option assignments are listed in the group and personal calendars for each user to view.

In addition, once the maximum number of attendees is reached (if any), a message indicating that the maximum number of participants for this event has been reached is displayed to additional recipients trying to sign-up for the event. When applicable, all participants have the ability to request a sub or replacement participant for the new event.

FIGS. 18A-18D illustrate another exemplary proposal of an event by a group member and/or player. In particular, the proposal of a tennis lesson via the system according to the present invention is illustrated.

Although the invention has been described with reference to a particular arrangement of parts, features and the like, these are not intended to exhaust all possible arrangements or features, and indeed many modifications and variations will be ascertainable to those of skill in the art.

What is claimed is:
1. A method for sports group management, comprising the steps of:
   providing a sports group management server;
   providing a plurality of databases accessible by said server including at least one of a player database, a substitute database, and a schedule database;

providing an Internet accessible user interface accessible by a plurality of players in a sports group;

receiving and managing group data via said user interface, the group data including information concerning the plurality of players, a start date, an end date, and a sports group type;

generating, by schedule software executing on said server, in response to a schedule request made through the user interface, a schedule of a plurality of group events for the plurality of players;

determining the number of the plurality of group events using the start date and end date, with the plurality of group events scheduled to begin on or after the start date and end on or before the end date;

assigning the plurality of players to the plurality of group events based at least in part on a preferred number of players for the sports group type, the plurality of players distributed among the plurality of group events such that each player is assigned a substantially equal number and more than one of the group events;

assigning remaining group events to players if the group events do not divide equally amongst the players;

receiving a substitute request via said user interface from one of the players assigned to one of the group events; and determining, by substitute software executing on said server, at least one substitute player for the group event according to at least one or more substitution rules indicated by the substitute request; and transmitting an invitation to the at least one substitute player, whereby the at least one substitute player accepts the invitation through the user interface; and wherein said sports group information, said player information, and said schedule may be edited through the user interface.

2. The method according to claim 1,
wherein the group data includes a gender and a rating for the sports group; and
wherein the substitution rule comprises the at least one substitute player has the same gender and rating as the sports group.

3. The method according to claim 1, further comprising:
providing reminder software executing on said server for transmitting a reminder of at least one of the group events to one or more of the plurality of players.

4. The method according to claim 3, wherein the reminder includes at least one of an email, a text message, and a telephone message.

5. The method according to claim 1,
wherein said plurality of databases further includes a location database; and wherein the method further comprises the step of providing location software executing on said server for determining a location for at least one of the group events from the location database based on a proximity to at least one of a group administrator and the plurality of players of the sports group.

6. The method according to claim 1, further comprising the step of
providing software executing on said server for receiving a proposed group event from one of the plurality of players and transmitting an invitation to the proposed event to at least a portion of the plurality of players.

7. The method according to claim 1, wherein the group events include at least one of a match and a lesson.

8. The method according to claim 1, wherein the invitation is transmitted by at least one of an email and a text message.

9. The method according to claim 1, further comprising the step of:
providing software executing on said server for receiving an acceptance of the invitation, wherein the acceptance is received by at least one of an email and a text message.

10. The method according to claim 1,
wherein the at least one substitute includes two or more potential substitutes; and
wherein said substitute software transmits a first invitation to potential substitutes who are players in the sports group, and then transmits a second invitation to potential substitutes who are not players in the sports group after a predetermined amount of time.

11. The method according to claim 1, wherein the substitution rule comprises the at least one substitute is determined from a substitute database including at least a portion of the plurality of players and one or more players from at least one other sports group.

12. The method according to claim 1, wherein the substitution rule comprises the at least one substitute is selected from substitutes located within a predetermined distance of a location of the match.

13. The method according to claim 1, wherein the substitution rule comprises the at least one substitute is selected from substitutes available at the time for which a substitute is requested.

14. The method according to claim 1, wherein at least one player assigned to each group event is assigned a task.

15. The method according to claim 14, wherein the task is to bring tennis balls.

16. The method according to claim 1, wherein the sports group type is doubles tennis.

* * * * *